(12) United States Patent
Sumioka et al.

(10) Patent No.: US 8,229,087 B2
(45) Date of Patent: Jul. 24, 2012

(54) RELAY APPARATUS, RELAY METHOD, RELAY PROGRAM, AND COMMUNICATION SYSTEM

(75) Inventors: Motoshi Sumioka, Kawasaki (JP); Ryuichi Matsukura, Kawasaki (JP); Hitoshi Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1649 days.

(21) Appl. No.: 11/525,053

(22) Filed: Sep. 22, 2006

(65) Prior Publication Data
US 2007/0263818 A1    Nov. 15, 2007

(30) Foreign Application Priority Data
Mar. 31, 2006    (JP) ................. 2006-100277

(51) Int. Cl.
*H04M 11/00*    (2006.01)
(52) U.S. Cl. ................. 379/88.13; 379/93.01
(58) Field of Classification Search ............... 379/88.22, 379/266.01; 370/458
See application file for complete search history.

(56) References Cited

U.S. PATENT DOCUMENTS

| | | | |
|---|---|---|---|
| 5,515,379 A * | 5/1996 | Crisler et al. ............. | 370/347 |
| 5,881,060 A * | 3/1999 | Morrow et al. ............ | 370/337 |
| 6,011,790 A * | 1/2000 | Fisher ....................... | 370/349 |
| 6,148,204 A * | 11/2000 | Urs et al. .................. | 455/433 |
| 6,229,820 B1 | 5/2001 | Kanemaki et al. | |
| 6,522,628 B1 * | 2/2003 | Patel et al. ............... | 370/230.1 |
| 6,834,341 B1 * | 12/2004 | Bahl et al. ................ | 713/156 |
| 6,865,185 B1 * | 3/2005 | Patel et al. ............... | 370/412 |
| 6,973,315 B1 | 12/2005 | Miernik et al. | |
| 6,980,523 B1 * | 12/2005 | Lipford et al. ............ | 370/252 |
| 7,043,225 B1 * | 5/2006 | Patel et al. ............... | 455/405 |
| 7,068,624 B1 * | 6/2006 | Dantu et al. ............... | 370/331 |
| 7,073,055 B1 * | 7/2006 | Freed et al. ............... | 713/155 |
| 7,089,316 B2 * | 8/2006 | Andersen et al. .......... | 709/229 |
| 7,346,335 B2 * | 3/2008 | Aaron ....................... | 455/404.1 |
| 7,471,629 B2 * | 12/2008 | Melpignano ............... | 370/232 |

(Continued)

FOREIGN PATENT DOCUMENTS

JP    11-313048    11/1998

(Continued)

OTHER PUBLICATIONS

Partial European Search Report issued in corresponding European Patent Application No. 06254984.5—1244, mailed on Jul. 27, 2007.

(Continued)

*Primary Examiner* — Joseph T Phan
(74) *Attorney, Agent, or Firm* — Staas & Halsey LLP

(57) ABSTRACT

A relay apparatus for relaying communication between a plurality of wireless terminals and a wired network includes a priority data recording part for recording communication identification data and required bandwidth data, a priority control part for relaying, by priority, the communication recorded in the priority data recording part, a request receiving part for receiving communication identification data and multimedia type data, a selecting part for selecting a multimedia type to be relayed by priority, an updating part for additionally recording data that represents a bandwidth required for relaying a stream of the selected multimedia type and the communication identification data, and a responding part for transmitting a response. The selecting part selects the multimedia type so that a sum of bandwidths represented by the required bandwidth data does not exceed a predetermined upper limit value. With the above configuration, the relay apparatus can perform bandwidth control of communication to be relayed, considering the multimedia type included in the communication by a wireless terminal.

11 Claims, 14 Drawing Sheets

U.S. PATENT DOCUMENTS

| | | | | |
|---|---|---|---|---|
| 7,480,263 B2* | 1/2009 | Junger et al. | | 370/296 |
| 7,564,783 B2* | 7/2009 | Klein et al. | | 370/230 |
| 7,620,745 B2* | 11/2009 | Kraus | | 710/22 |
| 7,623,841 B2* | 11/2009 | Aaron | | 455/404.1 |
| 7,668,170 B2* | 2/2010 | Deshpande | | 370/394 |
| 7,765,294 B2* | 7/2010 | Edwards et al. | | 709/224 |
| 7,808,918 B2* | 10/2010 | Bugenhagen | | 370/242 |
| 7,843,831 B2* | 11/2010 | Morrill et al. | | 370/235 |
| 7,940,735 B2* | 5/2011 | Kozisek et al. | | 370/338 |
| 7,948,909 B2* | 5/2011 | Bugenhagen et al. | | 370/252 |
| 7,953,880 B2* | 5/2011 | Deshpande | | 709/231 |
| 7,974,239 B2* | 7/2011 | Chen et al. | | 370/329 |
| 8,000,318 B2* | 8/2011 | Wiley et al. | | 370/352 |
| 8,015,294 B2* | 9/2011 | Bugenhagen et al. | | 709/227 |
| 8,040,811 B2* | 10/2011 | Edwards et al. | | 370/241 |
| 8,064,391 B2* | 11/2011 | Kozisek et al. | | 370/329 |
| 8,098,579 B2* | 1/2012 | Ray et al. | | 370/230 |
| 8,102,770 B2* | 1/2012 | Morrill et al. | | 370/235 |
| 8,107,366 B2* | 1/2012 | Wiley et al. | | 370/230 |
| 8,125,897 B2* | 2/2012 | Ray et al. | | 370/229 |
| 8,130,793 B2* | 3/2012 | Edwards et al. | | 370/486 |
| 2002/0075844 A1* | 6/2002 | Hagen | | 370/351 |
| 2002/0093930 A1 | 7/2002 | Dertz et al. | | |
| 2002/0099854 A1* | 7/2002 | Jorgensen | | 709/249 |
| 2002/0136224 A1* | 9/2002 | Motley | | 370/401 |
| 2003/0069964 A1* | 4/2003 | Shteyn et al. | | 709/225 |
| 2003/0187986 A1* | 10/2003 | Sundqvist et al. | | 709/225 |
| 2004/0023641 A1 | 2/2004 | Tsutsumi et al. | | |
| 2004/0034683 A1 | 2/2004 | Zhao | | |
| 2004/0095914 A1* | 5/2004 | Katsube et al. | | 370/338 |
| 2004/0199604 A1* | 10/2004 | Dobbins et al. | | 709/217 |
| 2004/0199667 A1* | 10/2004 | Dobbins | | 709/240 |
| 2004/0228356 A1* | 11/2004 | Adamczyk et al. | | 370/401 |
| 2005/0047364 A1 | 3/2005 | Matsukura et al. | | |
| 2005/0070230 A1 | 3/2005 | Das et al. | | |
| 2006/0120312 A1* | 6/2006 | Yamauchi et al. | | 370/310 |
| 2006/0208074 A1* | 9/2006 | Eglen et al. | | 235/383 |
| 2007/0263818 A1* | 11/2007 | Sumioka et al. | | 379/201.01 |
| 2010/0214911 A1* | 8/2010 | Cooke et al. | | 370/229 |

FOREIGN PATENT DOCUMENTS

| | | |
|---|---|---|
| JP | 11-88356 | 3/1999 |
| JP | 2003-87304 | 3/2003 |
| JP | 2003-284144 | 10/2003 |
| JP | 2004-508772 | 3/2005 |
| JP | 2005-80157 | 3/2005 |

OTHER PUBLICATIONS

Japanese Office Action mailed on Oct. 12, 2010 in corresponding Japanese Patent Application 2006-100277.

Malik S. A. et al., "Resource Allocation for Multimedia Services on the UMTS Downlink", IEEE International Conference on Communications, Apr. 28, 2002, pp. 3076-3080.

Extended European Search Report, issued in corresponding European Patent Application No. 06254984.5 on Nov. 2, 2007.

* cited by examiner

| | Source IP address | Destination IP address | State | Required bandwidth |
|---|---|---|---|---|
| 1 | 10.254.212.195 | 10.254.212.196 | During communication | 128 |
| 2 | 10.254.212.195 | 10.254.212.196 | Reservation | 420 |
| 3 | | | | |
| | | | | |

FIG. 3

| Priority | Multimedia type |
|---|---|
| 1 | Audio |
| 2 | Video |
| | |
| | |

FIG. 4 m=audio 49170 RTP/AVP 0
m=video 51372 RTP/AVP 31

FIG. 7A m=audio 49170 RTP/AVP 0

FIG. 7B

| Multimedia type | Required bandwidth |
|---|---|
| Audio | 128 |
| Video | 420 |
| Character | 10 |
|  |  |

| Stream | Table |
|---|---|
| Audio, Character | Multimedia priority table A |
| Audio, Video | Multimedia priority table B |
| Right audio, video, left audio | Multimedia priority table C |
| ... | ... |

Multimedia priority table A

| Priority | Multimedia type |
|---|---|
| 1 | Character |
| 2 | Audio |

Multimedia priority table B

| Priority | Multimedia type |
|---|---|
| 1 | Video |
| 2 | Audio |

Multimedia priority table C

| Priority | Multimedia type |
|---|---|
| 1 | Right audio |
| 2 | Video |
| 3 | Left audio |

| User Agent ID | Table |
|---|---|
| A-phone | Telephone |
| B-phone | Telephone |
| C-camera | Camera |
| D-TV100 | TV conference system |
| ... | ... |

37

Telephone 38a

| Priority | Multimedia type |
|---|---|
| 1 | Audio |
| 2 | Character |
| 3 | Video |

Camera 38b

| Priority | Multimedia type |
|---|---|
| 1 | Video |
| 2 | Audio |
| 3 | Character |

TV conference system 38c

| Priority | Multimedia type |
|---|---|
| 1 | Audio |
| 2 | Video |
| 3 | Character |

FIG. 12

| Required bandwidth | Required available bandwidth |
|---|---|
| ~200 | =Required band |
| 201~400 | 800 |
| 401~800 | 1600 |
| 801 or more | 128 × Average number of telephone conversations |

41

Priority: 1 — 39a

| | Source IP address | Destination IP address | Port number | State | Required bandwidth |
|---|---|---|---|---|---|
| 1 | 10.254.212.195 | 10.254.212.196 | 49170 | Under communication | 128 |
| 2 | 10.254.212.194 | 10.254.212.197 | 49170 | Reservation | 420 |
| 3 | 10.254.212.195 | 10.254.212.196 | 49170 | Reservation | 128 |

Priority: 2 — 39b

| | Source IP address | Destination IP address | Port number | State | Required bandwidth |
|---|---|---|---|---|---|
| 1 | 10.254.212.195 | 10.254.212.196 | 51372 | Under communication | 128 |
| 2 | 10.254.212.195 | 10.254.212.196 | 49170 | Reservation | 128 |
| 3 | | | | | |

FIG. 14

RELAY APPARATUS, RELAY METHOD, RELAY PROGRAM, AND COMMUNICATION SYSTEM

BACKGROUND OF THE INVENTION

1. Field of the Invention

The present invention relates to a relay apparatus for relaying communication between wireless terminals and a wired network, and in particular, to a relay apparatus, a relay method, and a relay program for ensuring the quality of communication to be relayed, and a communication system including the relay apparatus.

2. Description of Related Art

Recently, for example, as in an IP telephone via a wireless LAN, a mobile terminal that performs a telephone conversion via wireless communication has become widespread. The mobile terminal that performs a telephone conversation via wireless communication enables a telephone conversation with a wired network by performing wireless communication with a relay apparatus (e.g., an access point of a wireless LAN, etc.). In such a communication form, mobile terminals are present in a communication area of a relay apparatus, whereby simultaneous telephone conversations by the mobile terminals occur. In this case, those mobile terminals share a communication bandwidth available in the relay apparatus, and perform communication respectively. Therefore, in the case where the number of mobile terminals that perform telephone conversations simultaneously via one relay apparatus increases, the communication bandwidth becomes insufficient. Consequently, at a mobile terminal, delays in audio communication from a terminal on a partner side is increased, and a noise such as a sound break occurs. This problem may occur in the case of communicating data such as music or a moving picture by streaming, as well as in the case of a telephone conversation. In General, the realtime communication to transmit streaming data as in a IP telephony service, a music distribution, a movie distribution, and the like, the shortage of a communication bandwidth in the relay apparatus degrades communication quality.

In order to prevent the shortage of a communication bandwidth in a relay apparatus, for example, a method has been adopted for rejecting the starting of a telephone conversation via the relay apparatus when the amount of a communication bandwidth available in the relay apparatus is not sufficient. Furthermore, a method has also been proposed, in which a call control apparatus receives traffic information from a relay apparatus at a constant interval, and controls the acceptance/rejection of communication to be relayed by the relay apparatus based on the received traffic information (e.g., see JP 2003-284144 A). The call control apparatus restrained making a new call to be relayed by the relay apparatus consuming large amount of traffic bandwidth when the usable bandwidth is already full.

However, in the above-mentioned conventional example, a multimedia type included in communication to be relayed by the relay apparatus has not been considered. Therefore, even in the multimedia communication which contains both audio and video streams, the relay apparatus was not able to perform a relay considering multimedia types (e.g., a preferential relay only for an audio stream). Because recent wireless terminals can handle multimedia communications, such relay apparatus should consider those multimedia types.

SUMMARY OF THE INVENTION

Therefore, there is a demand for a bandwidth control of a relay apparatus considering a multimedia type included in communication. The object of the present invention is to provide a relay apparatus, a relay method, a relay program, and a communication system capable of controlling a bandwidth of communication to be relayed, considering a multimedia type included in the communication by a wireless terminal.

A relay apparatus of the present invention for relaying communication between a plurality of wireless terminals and a wired network, includes: a wireless communication part for enabling wireless communication between the plurality of wireless terminals and the relay apparatus; a wired network connecting part for connecting the relay apparatus and the wired network including a communication control apparatus that controls starting and ending of communication between the wireless terminals; a priority data recording part for recording communication identification data that represents a prioritized communication to be relayed by priority and required bandwidth data that represents a quantity of the transport bandwidth required by the prioritized communication; a priority control part for relaying the prioritized communication by priority compared with the others based on the communication identification data recorded in the priority data recording part; a request receiving part for receiving, from the wireless terminal, a request message that contains communication identification data representing a starting communication and multimedia type data representing one or more multimedia types of the streaming communication contained within the starting communication; a selecting part for selecting at least one multimedia type of the streaming communication contained within the starting communication, referring the required bandwidth data recorded in the priority data recording part and data representing bandwidth required for relaying each streaming communication calculated by the multimedia type data; an updating part for updating the data which is recorded in the priority data recording part, newly adding data representing a quantity of bandwidth for relaying the streaming communication whose multimedia type is selected by the selecting part and the communication identification data representing a starting communication; a responding part for transmitting data that represents the streaming communication to be relayed by priority, selected by the selecting part, to the communication control apparatus, as a response to the request message. The selecting part selects the multimedia type of the each streaming communication contained within the starting communication not to exceed a predetermined upper limit of the total value of bandwidth required for relaying the prioritized communication even if adding the required bandwidth for relaying the starting communication.

The call control apparatus transmits a request to prioritize starting communication of a wireless terminal to a relay apparatus. The request receiving part of the relay apparatus receives the request message from the communication control apparatus together with the communication identification data that represents communication requested for priority and multimedia type data that represents each multimedia type of streaming communication included in the communication. The selecting part selects a multimedia type of the streaming communication to be relayed prioritized. At this time, the selecting part selects the multimedia type of streaming communication so that the total value of required bandwidth does not exceed a predetermined upper limit value for the required bandwidth data which is recorded in the priority data recording part even if adding requested bandwidth is consumed by the request message. Therefore, the total bandwidth required by relaying the streaming communications never exceed the upper limit for it. As the result, the priority control part can relay, by priority, the communication recorded in the priority data recording part stably. Furthermore, the responding part can transmit a set of multimedia types accepted by the call control apparatus. Consequently, the communication control apparatus can control the starting of the communication for each multimedia type of streams included in communication of a wireless terminal, based on the multimedia type of the stream to be relayed by priority in the relay apparatus. Thus, the bandwidth control of communication to be relayed can be performed considering the multimedia type of a stream included in communication by a wireless terminal.

The relay apparatus according to the present invention may further include a precedence recording part that records a precedence of a plurality of multimedia types, wherein the selecting part selects at least one multimedia type of the streaming communication to be relayed by priority based on the precedence recorded in the precedence recording part.

The selecting part selects a multimedia type of a stream to be relayed by priority based on a precedence recorded in the precedence recording part, so that the precedence of a stream to be relayed can be managed by the precedence recording part.

In the relay apparatus according to the present invention, it is preferable that the selecting part requests the communication control apparatus to inquire of a wireless terminal that requests starting of communication about a multimedia type of a streaming communication to be relayed by priority, obtains data that represents the multimedia type of the streaming communication to be relayed by priority as a response to the request from the communication control apparatus, and selects the multimedia type of the streaming communication based on the obtained data.

The selecting part selects a multimedia type of a stream to be relayed by priority based on data obtained as a response to a request for an inquiry with respect to a wireless terminal. Therefore, the multimedia type requested by a user of a wireless terminal that is ready to start communication can be selected as the multimedia type of a stream to be relayed by priority.

A relay apparatus according to the present invention for relaying communication between a plurality of wireless terminals and a wired network, includes: a wireless communication part for enabling wireless communication between the plurality of wireless terminals and the relay apparatus; a wired network connecting part for connecting the relay apparatus and the wired network including a communication control apparatus that controls start and ending of communication of the wireless terminals; a plurality of priority grade data recording parts for recording stream identification data for identifying a streaming communication to be relayed by priority with respect to each stage of priority provided in a plurality of stages; a precedence recording part for recording precedence of a plurality of multimedia types; a priority control part for relaying a streaming communication specified by the stream identification data recorded in the priority grade data recording part with higher priority, by priority compared with a streaming communication specified by the stream identification data recorded in the priority grade data recording part with lower priority; a request receiving part for receiving a request message containing the communication identification data that represents a starting communication of a wireless terminal ready to be started and multimedia type data that represents each multimedia type of one or a plurality of streaming communications included in the starting communication; a priority determining part for determining priority with respect to a streaming communication of each multimedia type represented by the multimedia type data, based on the precedence recorded in the precedence recording part; and an updating part for recording the stream identification data for identifying the streaming communication specified by the communication identification data and the multimedia type data in the priority grade data recording part in accordance with the priority determined by the priority determining part, with respect to the streaming communication of each multimedia type.

The priority determining part determines priority of a stream of each multimedia type included in communication requested for relay from the communication control apparatus, based on the precedence recorded in the precedence recording part, and the updating part records stream identification data for identifying a stream specified by the communication identification data and the multimedia type data in the priority grade data recording part in accordance with the priority determined by the priority determining part, with respect to a stream of each multimedia type. The priority control part relays a stream specified by the stream identification data recorded in the priority grade data recording part with higher priority, by priority compared with a stream specified by the stream identification data recorded in the priority grade data recording part with lower priority. Thus, the priority of relay is controlled for each multimedia type included in communication, in accordance with the data in the priority grade data recording part. Therefore, the relay apparatus can perform bandwidth control of communication to be relayed, considering the multimedia type of a stream included in the communication by a wireless terminal.

A communication system according to the present invention accessible wirelessly from a plurality of wireless terminals, includes: a relay apparatus for relaying communication between a wired network and the plurality of wireless terminals, and a communication control apparatus connected to the relay apparatus via the wired network. The communication control apparatus includes: an interconnecting part for transmitting a request message that contains communication identification data representing a starting communication and multimedia type data representing one or more multimedia types of the streaming communication contained within the starting communication, based on a request for starting of communication received from an arbitrary wireless terminal; and a communication control part for receiving a response to the request message transmitted by the interconnecting part from the relay apparatus, and controlling the starting of communication for each streaming communication included in the starting communication based on the response. The relay apparatus includes: a priority data recording part for recording communication identification data that represents a prioritized communication to be relayed by priority and the required bandwidth data that represents a quantity of the transport bandwidth required by the prioritized communication; a priority control part for relaying the prioritized communication by priority compared with the others based on the communication identification data recorded in the priority data recording part; a request receiving part for receiving, from the wireless terminal, a request message that contains communication identification data representing a starting communication and multimedia type data representing one or more multimedia types of the streaming communication contained within the starting communication; a selecting part for selecting at least one multimedia type of the streaming communication contained within the starting communication, referring the required bandwidth data recorded in the priority data recording part and data representing bandwidth required for relaying each streaming communication calculated by the multimedia type data; an updating part for updating the data which is recorded in the priority data recording part, newly adding data representing a quantity of bandwidth for relaying the streaming communication whose multimedia type is selected by the selecting part and the communication identification data representing a starting communication; a responding part for transmitting data that represents the streaming communication to be relayed by priority, selected by the selecting part, to the communication control apparatus, as a response to the request message. The selecting part selects the multimedia type of the each streaming communication contained within the starting communication not to exceed a predetermined upper limit of the total value of bandwidth required for relaying the prioritized communication even if adding the required bandwidth for relaying the starting communication.

A relay method according to the present invention is a method for a relay apparatus to relay communication between a plurality of wireless terminals and a wired network. The relay apparatus includes: a wireless communication part for enabling wireless communication between the plurality of wireless terminals and the relay apparatus; a wired network connecting part for connecting the relay apparatus and the wired network including a communication control apparatus that controls starting and ending of communication between the wireless terminals; and a priority data recording part for recording communication identification data that represents a prioritized communication to be relayed by priority and required bandwidth data that represents a quantity of the transport bandwidth required by the prioritized communication. The method includes: a request receiving operation of receiving, from the wireless terminal, a request message that contains communication identification data representing a starting communication and multimedia type data representing one or more multimedia types of the streaming communication contained within the starting communication; a selecting operation of selecting at least one multimedia type of the streaming communication contained within the starting communication, by referring the required bandwidth data recorded in the priority data recording part and data representing bandwidth required for relaying each streaming communication calculated by the multimedia type data; an updating operation of updating the data which is recorded in the priority data recording part, by newly adding data representing a quantity of bandwidth for relaying the streaming communication whose multimedia type is selected by the selecting operation and the communication identification data representing a starting communication; and a responding operation of transmitting data that represents the streaming communication to be relayed by priority, selected by the selecting operation, to the communication control apparatus, as a response to the request message. In the selecting operation, the multimedia type of the each streaming communication contained within the starting communication is selected not to exceed a predetermined upper limit of the total value of bandwidth required for relaying the prioritized communication even if adding the required bandwidth for relaying the starting communication.

A relay program according to the present invention is stored in a recording medium and causes a computer to execute processing of relaying communication between a plurality of wireless terminals and a wired network. The computer includes: a wireless communication part for enabling wireless communication between the plurality of wireless terminals and the computer; a wired network connecting part for connecting the computer and the wired network including a communication control apparatus that controls starting and ending of communication between the wireless terminals; and a priority data recording part for recording communication identification data that represents a prioritized communication to be relayed by priority and required bandwidth data that represents a quantity of the transport bandwidth required by the prioritized communication. The program causes the computer to execute: request receiving processing of receiving, from the wireless terminal, a request message that contains communication identification data representing a starting communication and multimedia type data representing one or more multimedia types of the streaming communication contained within the starting communication; selecting processing of selecting at least one multimedia type of the streaming communication contained within the starting communication, by referring the required bandwidth data recorded in the priority data recording part and data representing bandwidth required for relaying each streaming communication calculated by the multimedia type data; updating processing of updating the data which is recorded in the priority data recording part, by newly adding data representing a quantity of bandwidth for relaying the streaming communication whose multimedia type is selected by the selecting processing and the communication identification data representing a starting communication; and responding processing of transmitting data that represents the streaming communication to be relayed by priority, selected by the selecting processing, to the communication control apparatus, as a response to the request message. In the selecting processing, the multimedia type of the each streaming communication contained within the starting communication is selected not to exceed a predetermined upper limit of the total value of bandwidth required for relaying the prioritized communication even if adding the required bandwidth for relaying the starting communication.

A relay method according to the present invention is a method for a relay apparatus to relay communication between a plurality of wireless terminals and a wired network. The relay apparatus includes: a wireless communication part for enabling wireless communication between the plurality of wireless terminals and the relay apparatus; a wired network connecting part for connecting the relay apparatus and the wired network including a communication control apparatus that controls starting and ending of communication of the wireless terminals; a plurality of priority grade data recording parts for recording stream identification data for identifying a streaming communication to be relayed by priority with respect to each stage of priority provided in a plurality of stages; and a precedence recording part for recording precedence of a plurality of multimedia types. The method includes: a priority control operation of relaying a streaming communication specified by the stream identification data recorded in the priority grade data recording part with higher priority, by priority compared with a streaming communication specified by the stream identification data recorded in the priority grade data recording part with lower priority; a request receiving operation of receiving a request message containing the communication identification data that represents a starting communication of a wireless terminal ready to be started and multimedia type data that represents each multimedia type of one or a plurality of streaming communications included in the starting communication; a priority determining operation of determining priority with respect to a streaming communication of each multimedia type represented by the multimedia type data, based on the precedence recorded in the precedence recording part; and an updating operation of recording the stream identification data for identifying the streaming communication specified by the communication identification data and the multimedia type data in the priority grade data recording part in accordance with the priority determined by the priority determining operation, with respect to the streaming communication of each multimedia type.

A relay program according to the present invention is stored in a recording medium and causes a computer to execute processing of relaying communication between a plurality of wireless terminals and a wired network. The computer including: a wireless communication part for enabling wireless communication between the plurality of wireless terminals and the computer; a wired network connecting part for connecting the computer and the wired network including a communication control apparatus that controls starting and ending of communication of the wireless terminals; a plurality of priority grade data recording parts for recording stream identification data for identifying a streaming communication to be relayed by priority with respect to each stage of priority provided in a plurality of stages; and a precedence recording part for recording precedence of a plurality of multimedia types. The program causes the computer to execute: priority control processing of relaying a stream specified by the stream identification data recorded in the priority grade data recording part with higher priority, by priority compared with a stream specified by the stream identification data recorded in the priority grade data recording part with lower priority; request receiving processing of receiving a request message containing the communication identification data that represents a starting communication of a wireless terminal ready to be started and multimedia type data that represents each multimedia type of one or a plurality of streaming communications included in the starting communication; priority determining processing of determining priority with respect to a streaming communication of each multimedia type represented by the multimedia type data, based on the precedence recorded in the precedence recording part; and updating processing of recording the stream identification data for identifying the streaming communication specified by the communication identification data and the multimedia type data in the priority grade data recording part in accordance with the priority determined in the priority determining processing, with respect to the streaming communication of each multimedia type.

According to the present invention, a relay apparatus, a relay method, a relay program, and a communication system can be provided, which are capable of controlling the bandwidth of communication to be relayed, considering the multimedia type included in communication by a wireless terminal.

BRIEF DESCRIPTION OF THE DRAWINGS

FIG. 2 is a functional block diagram showing a detailed configuration of an AP 1a.

FIG. 3 is a diagram showing a specific example of data recorded in a priority data recording part 13.

FIG. 4 is a diagram showing a specific example of data recorded in a precedence recording part 11.

FIG. 6 is a sequence diagram showing an example of processing when a request for a bandwidth reservation is transmitted to the AP 1a.

FIGS. 7A and 7B show specific examples of a part of SDP data.

FIG. 8 is a diagram showing an example of a required bandwidth table 35 for recording a required bandwidth with respect to each multimedia type.

FIG. 9 is a sequence diagram showing an example of processing when a request for a bandwidth reservation is transmitted to the AP 1a.

FIG. 10 is a diagram showing an example of data recorded in a precedence recording part 11 in a first modified example.

FIG. 11 is a diagram showing an example of data recorded in the precedence recording part 11 in a second modified example.

FIG. 12 is a diagram showing a required available bandwidth table 41.

FIG. 14 is a diagram showing a specific example of data recorded in a priority grade data recording part 16.

FIG. 17 is a sequence diagram showing an example of processing when a request for a bandwidth reservation is transmitted to the AP 100a.

DETAILED DESCRIPTION OF THE INVENTION

Hereinafter, the present invention will be described in detail by way of one embodiment with reference to the drawings.

Embodiment 1

Figure 1:
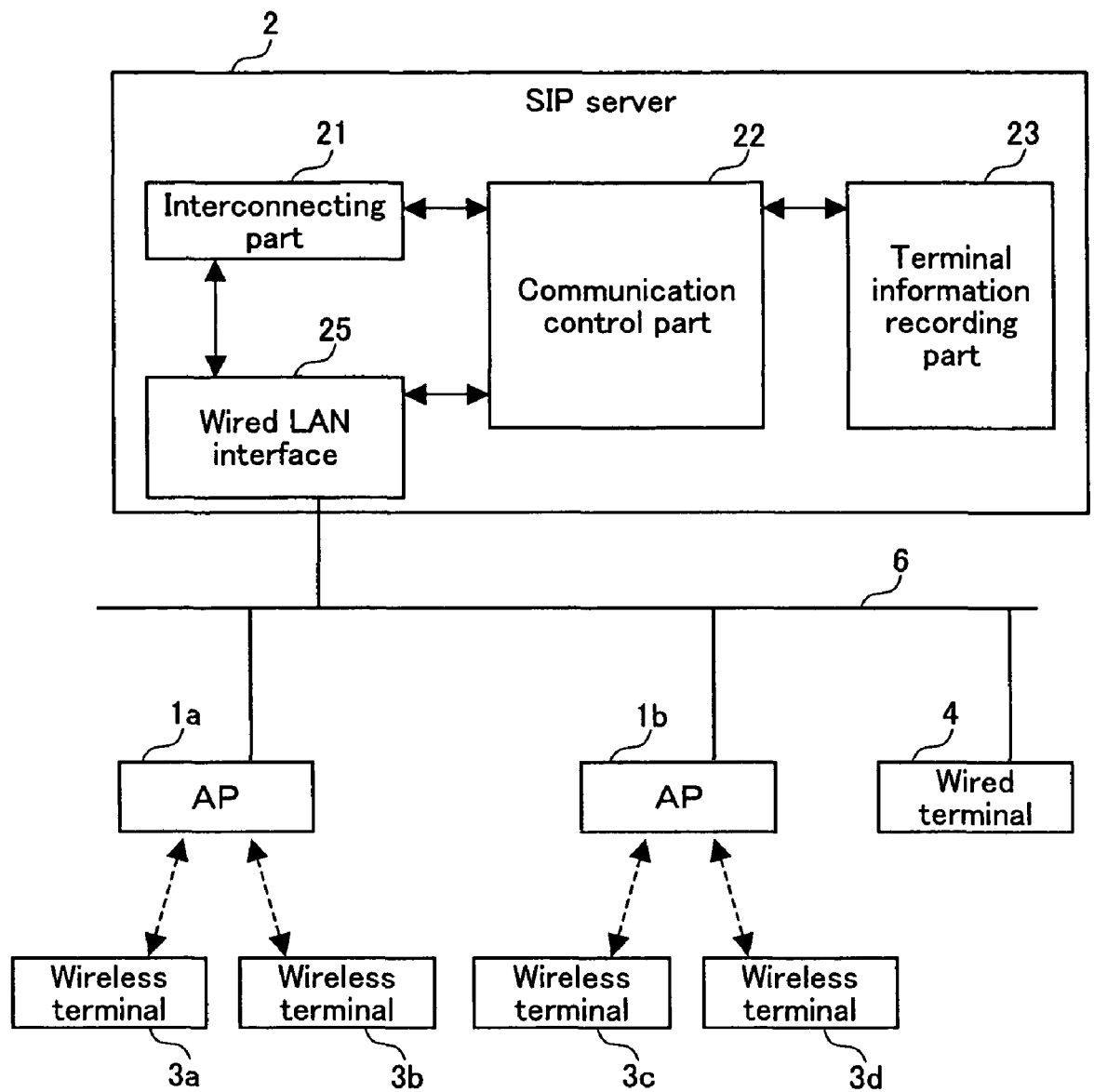
FIG. 1 is a diagram showing an entire configuration of a wireless communication system in Embodiment 1.

FIG. 1 is a diagram showing an entire configuration of a wireless communication system in Embodiment 1. The wireless communication system in the present embodiment includes an SIP server 2, wireless LAN access points (hereinafter, referred to as APs) 1a, 1b, a wired terminal 4, and wireless terminals 3a-3d. The SIP server 2, the APs 1a, 1b, and the wired terminal 4 are connected to each other through a wire by a wired local area network (LAN) 6. The wireless terminals 3a-3d can access the AP 1a or AP 1b wirelessly. FIG. 1 shows, as an example, a state in which the wireless terminals 3a, 3b can access the AP 1a, and the wireless terminals 3c, 3d can access the AP 1b. In this state, the AP 1a relays the communication between the wireless terminals 3a, 3b and the wired LAN 6, and the AP 1b relays the communication between the wireless terminals 3c, 3d and the wired LAN 6.

Each of the wireless terminals 3a to 3d communicates with another wireless terminal or the wired terminal 4 via the AP 1a or 1b, and the wired LAN 6. The starting of communication performed by the wireless terminal is controlled by the SIP server 2.

The communication of the wireless terminal controlled by the SIP server 2 is specified by a transmission origin and a transmission destination. One or a plurality of transmission destinations may be used. The communication controlled by the SIP server 2 includes one or a plurality of streams. The stream is the communication channel to send streaming data in real time. Examples of the stream include audio data to be transmitted in a telephone conversation, and video data distributed in a moving picture distribution. Therefore, the communication controlled by the SIP server 2 has an attribute such as the number of streams. Furthermore, each stream has an attribute such as a multimedia type. Examples of the multimedia type of a stream include an audio, a character, a moving picture, a still picture, and pointing position information. Furthermore, two multimedia types may be included in an audio, for example, as in a right audio and a left audio of a stereo audio. In communication, different streams for each multimedia type are transmitted. In the present embodiment, as an example, the case will be described where the wireless terminals 3a-3d are IP telephones with a video reproducing function, and communication including multimedia types of a video stream and an audio stream can be performed.

The wireless terminals 3a-3d are not limited to IP telephones. Examples of the wireless terminals 3a-3d include a video reproducing terminal, a PDA, an electronic organizer, a game machine, and a GPS terminal. Furthermore, the communication of the wireless terminal whose starting is controlled by the SIP server 2 is not limited to a telephone conversation. Examples of the communication of the wireless terminal include a video distribution, a music distribution, an on-line game, a stock price information distribution, a remote presentation, a TV conference, and a monitoring camera image transmission. Furthermore, the number of the wireless terminals, and the number of the APs and the wired terminals connected to the wired LAN 6 are not limited to those shown in FIG. 1.

The SIP server 2 includes a wired LAN interface 25, an interconnecting part 21, a communication control part 22, and a terminal information recording part 23. The wired LAN interface 25 mediates the exchange of data between the SIP server 2 and the wired LAN 6 in conformity with the specification of the wired LAN.

The communication control part 22 receives a request for the starting and ending of communication from any of the wireless terminals 3a-3d, and controlling the starting and ending of communication by the wireless terminal. The communication control part 22 transmits various messages to the wireless terminal, thereby controlling the starting and ending of communication.

In the terminal information recording part 23, communication identification data for identifying the communication controlled by the communication control part 22 is recorded. The communication identification data contains, for example, information representing the position on a LAN of a communication terminal (including a wireless terminal and a wired terminal) that performs communication, and information for identifying a communication terminal. In the present embodiment, an example will be described in which the communication control part 22 controls the starting and ending of communication in accordance with a session initiation protocol (SIP).

The interconnecting part 21 requests the allocation of a bandwidth of communication ready to be started by the communication control part 22, and the deallocation of a bandwidth of ended communication. The interconnecting part 21 requests the allocation of a bandwidth, thereby requesting the APs 1a, 1b to relay, by priority, the communication ready to be started.

The SIP server 2 is composed of one or a plurality of computers such as a server machine, a personal computer, and a work station. Each function of the wired LAN interface 25, the interconnecting part 21, and the communication control part 22 is realized when a CPU of a computer executes a predetermined program. Furthermore, the terminal information recording part 23 is embodied by a recording medium contained in a computer or an external recording apparatus accessible by the computer. The SIP server 2 may be configured on one computer, or may be distributed in a plurality of computers connected to the wired LAN 6.

Figure 2:
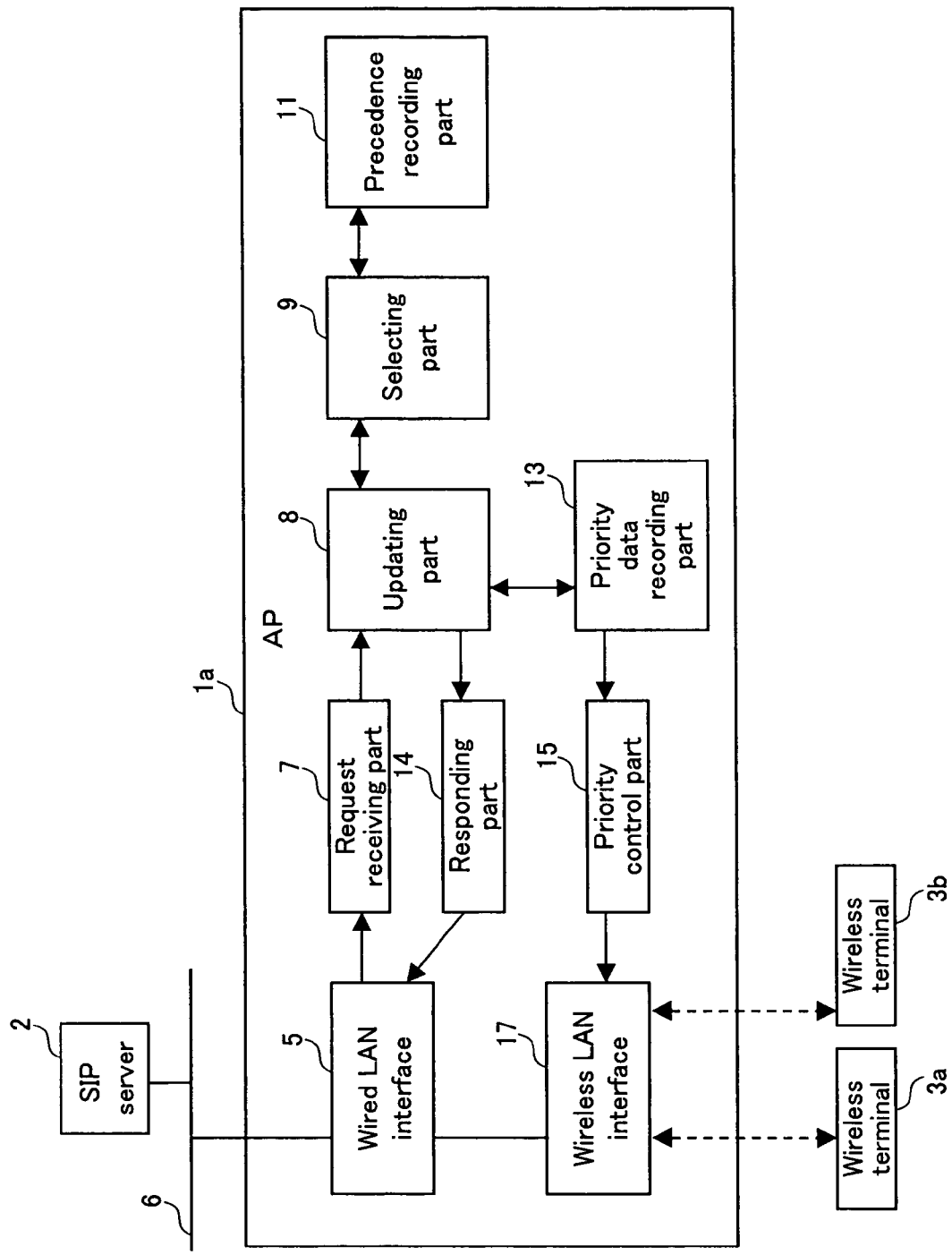

FIG. 2 is a functional block diagram showing a detailed configuration of the AP 1a. The configuration of the AP 1b is also the same as that of the AP 1a shown in FIG. 2. The AP 1a includes a wired LAN interface 5, a request receiving part 7, an updating part 8, a selecting part 9, a precedence recording part 11, a priority data recording part 13, a responding part 14, a priority control part 15, and a wireless LAN interface 17.

The wired LAN interface 5 mediates the exchange of data between the AP 1a and the wired LAN 6 in conformity with the specification of a wired LAN. The wireless LAN interface 17 mediates the wireless exchange of data with respect to the wireless terminals 3a and 3b in conformity of the specification of the wireless LAN. The communication between the wireless terminals 3a, 3b and the wired LAN 6 is relayed by the wireless LAN interface 17 and the wired LAN interface 5.

The priority control part 15 controls the priority of communication relayed by the wireless LAN interface 5, based on data recorded in the priority data recording part 13. The priority data recording part 13 stores communication identification data representing communication to be relayed by priority, and required bandwidth data representing a bandwidth required for communication to be relayed by priority.

FIG. 3 is a diagram showing a specific example of data recorded in the priority data recording part 13. FIG. 3 shows an example in which data to be recorded in the priority data recording part 13 is recorded as a priority table 31. The priority table 31 stores data representing a source IP address, a destination IP address, a call state, and a required bandwidth so that they are associated for each communication to be relayed by priority. A source IP address and a destination IP address are examples of communication identification data representing communication to be relayed by priority. The call state is data representing the state of communication represented by communication identification data. The required bandwidth is data representing a bandwidth required for communication represented by the communication identification data.

The communication identification data may be data capable of identifying communication, and is not limited to an example shown in FIG. 3. For example, as the communication identification data may contain a port number in addition to an IP address.

The priority control part 15 controls the wireless LAN interface 17 so that communication represented by the communication identification data recorded in the priority data recording part 13 is relayed by priority compared with the other communications.

The request receiving part 7 receives a request for relaying, by priority, communication of the wireless terminal ready to be started, from the interconnecting part 21 of the SIP server 2. At this time, the request receiving part 7 receives the communication identification data representing communication to be relayed by priority, and a set of multimedia type data representing the multimedia type of one or a plurality of streams included in the communication. The streams included in the communication are transmitted as separated streams for each multimedia type. Thus, the streams included in the communication can also be identified based on the multimedia type data.

The updating part 8 requests the selecting part 9 to select a stream to be relayed by priority among a plurality of streams capable of being identified based on the multimedia type data. The selecting part 9 calculates requiring bandwidth for relaying a stream of each multimedia type represented by the multimedia type data. The data representing a bandwidth required for relaying a stream of each multimedia type can be calculated, for example, using a fixed value for each multimedia type. Furthermore, a required bandwidth may be calculated on demand in accordance with a multimedia type. Furthermore, the data representing a required bandwidth may be contained in the multimedia type data received by the request receiving part 7.

The selecting part 9 selects a set of multimedia types of streaming communications to be relayed by priority, using the determined data of requiring bandwidth and the required bandwidth data recorded in the priority data recording part 13. The selecting part 9 selects a set of multimedia types so that, in the case of additionally recording the data representing a bandwidth required for relaying streams of the selected multimedia type, the sum of bandwidths represented by the required bandwidth data does not exceed a predetermined upper limit value. Furthermore, the selecting part 9 selects a multimedia type in accordance with a precedence recorded in the precedence recording part 11.

The precedence recording part 11 records the order of the priority for multimedia types. FIG. 4 shows a specific example of data recorded in the precedence recording part 11. In the example shown in FIG. 4, a precedence and a multimedia type are recorded in a multimedia priority table 32 so as to be associated with each other. Thus, by recording a precedence for each multimedia type in the APs, each AP can control a precedence for each multimedia type of a stream to be relayed in accordance with the situation peculiar to the AP.

The updating part 8 additionally records the data representing a bandwidth required for relaying the stream selected by the selecting part 9 and the communication identification data received by the request receiving part 7 in the priority data recording part 13. Furthermore, the responding part 14 transmits the stream of the multimedia type selected by the selecting part 9 (i.e., the data representing a stream to be relayed by priority) to the SIP server 2 as a response to the request. This response is transmitted to the SIP server 2 via the wired LAN interface 5.

The APs 1*a*, 1*b* are composed of a wireless communication relay apparatus with a computer incorporated therein. Each function of the wired LAN interface 5, the request receiving part 7, the updating part 8, the selecting part 9, the responding part 14, the priority control part 15, and the wireless LAN interface 17 is realized when a processor provided in a computer executes a predetermined program. Furthermore, the priority data recording part 13 and the precedence recording part 11 are embodied by a recording medium contained in a computer or an external recording apparatus accessible by the computer.

(Operation Example of the Wireless Communication System)

Figure 5:
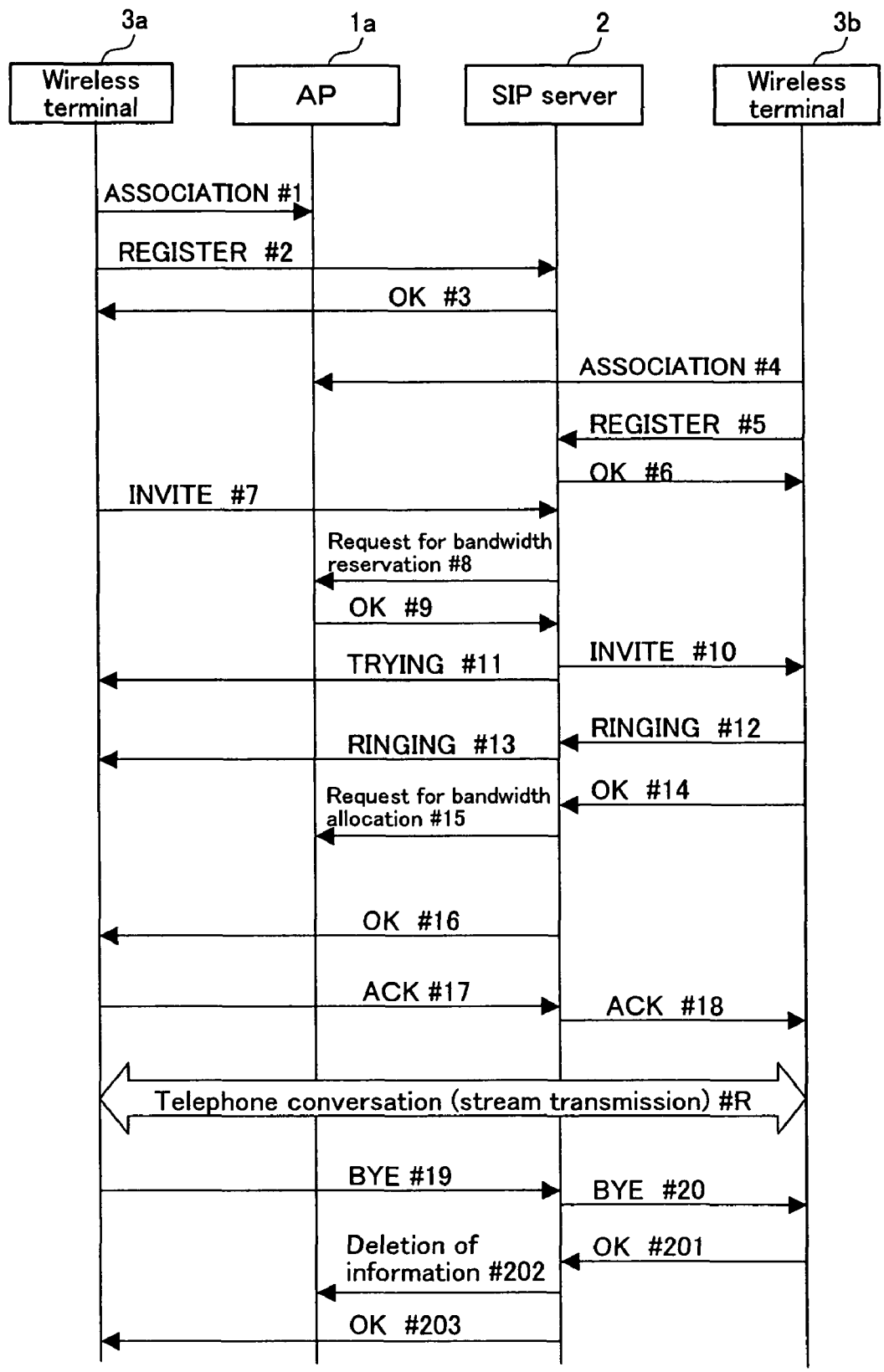
FIG. 5 is a diagram showing an operation example of the wireless communication system in the case where communication is performed by wireless terminals.

Next, an operation example of a wireless communication system in the case where communication is performed by wireless terminals will be described. FIG. 5 shows an operation example of a wireless communication system in the case where communication by the wireless terminals shown in FIG. 1 is performed. FIG. 5 shows, as an example, the processing in which the wireless terminals 3*a*, 3*b* accessible to the AP 1*a* start and end communication.

When the wireless terminal 3*a* is started up in a communication area of the AP 1*a*, the wireless terminal 3*a* sends a search message for searching for an AP (#1). The AP 1*a* responds to the search message, whereby the wireless terminal 3*a* recognizes the AP 1*a* as an accessible AP.

After that, the wireless terminal 3*a* transmits a REGISTER message to the SIP server 2 (#2). The REGISTER message contains, for example, terminal information such as positional information (e.g., an IP address, a port number, etc.) of the wireless terminal 3*a* and an identifier (e.g., a telephone number, a user ID, an SIP address, etc.) for calling the wireless terminal 3*a*. The SIP server 2 records the terminal information contained in the REGISTER message in the terminal information recording part 23. When the SIP server succeeds in this recording, the SIP server 2 transmits an OK message to the wireless terminal 3*a* (#3).

Similarly, when the wireless terminal 3*b* transmits a search message to the AP 1*a* (#4), and receives a response, the wireless terminal 3*b* transmits a REGISTER message to the SIP server 2 (#5). The SIP server 2 records the terminal information of the wireless terminal 3*b*, and transmits an OK message to the wireless terminal 3*b* (#6). The REGISTER message and the OK message are those which are defined by an SIP. Furthermore, INVITE, TRYING, RINGING, ACK, and BYE messages described below are also those which are defined by the SIP.

The wireless terminal 3*a* transmits an INVITE message for the wireless terminal 3*b* to the SIP server 2 (#7). Consequently, the wireless terminal 3*a* requests the SIP server 2 to start communication with the wireless terminal 3*b*. The INVITE message contains a multimedia type data representing a set of multimedia types of streams included in communication ready to be started, in addition to communication identification data representing communication ready to be started. The multimedia type data is contained, for example, in the INVITE message in a form according to a Session Description Protocol (SDP). Hereinafter, data in a form according to an SDP contained in the INVITE message is referred to as SDP data. The multimedia type data is contained in the SDP data. The SDP data may contain, for example, a protocol used in the transmission of a stream, information (e.g., codec information, etc.) to be a base for a bandwidth required for relaying a stream, and the like, in addition to a multimedia type.

The SIP server 2 having received the INVITE message specifies the positions of the wireless terminals 3*a*, 3*b* with reference to the terminal information recording part 23. Consequently, the SIP server 2 specifies that the AP that relays the communication ready to be started is the AP 1*a*. The SIP server 2 requests the AP 1*a* to make a bandwidth reservation for communication ready to be started (#8). More specifically, the SIP server 2 requests the AP 1*a* to relay, by priority, the communication ready to be started. At this time, the SIP server 2 transmits communication identification data for the communication ready to be started, and SDP data contained in the INVITE message to the AP 1*a*.

The AP 1*a* having received the request for a bandwidth reservation records the communication identification data, the required bandwidth data representing a bandwidth required for communication, and the data representing that bandwidth allocation is being reserved in the priority data recording part 13. Consequently, a bandwidth allocation is reserved. At a time of reservation, the AP 1*a* selects a set of multimedia type of a stream accepted as being relayed by priority, among the streams included in the communication. The bandwidth required for relaying the stream of the selected multimedia type is recorded in the priority data recording part 13 as required bandwidth data. When the AP 1*a* reserves a bandwidth, the AP 1*a* transmits an OK message to the SIP server 2 as a response with respect to the request for a bandwidth reservation (#9). The detail of processing in which the AP 1*a* reserves bandwidth allocation will be described later. At this time, the OK message contains SDP data. The SDP data contains information representing the set of streams whose bandwidth allocation was successfully reserved.

When the SIP server 2 receives the OK message, the SIP server 2 transmits an INVITE message to the wireless terminal 3b (#10). Furthermore, the SIP server 2 transmits a TRYING message to the wireless terminal 3a (#11). In the case where the AP 1a fails in reserving bandwidth allocation, and the SIP server 2 receives an error message, the SIP server 2 may, for example, transmit a disconnection message to the wireless terminal 3a without starting the communication between the wireless terminals 3a, 3b.

The wireless terminal 3b having received the INVITE message from the SIP server 2 transmits a RINGING message representing "during calling" to the SIP server 2 (#12). The RINGING message received by the SIP server 2 is transmitted to the wireless terminal 3a (#13).

When a user of the wireless terminal 3b performs an operation of accepting a request for the starting of communication with respect to the wireless terminal 3b, an OK message is transmitted from the wireless terminal 3b to the SIP server 2 (#14). The SIP server 2 requests the AP 1a to allocate a bandwidth for communication ready to be started (#15). Because of this, the AP 1a finalizes the allocation of a bandwidth reserved in #8. Consequently, the wireless communication between the AP 1a and the wireless terminal 3a, and the wireless communication between the AP 1 bandwidth the wireless terminal 3b are performed by priority compared with the other wireless communications. The specific processing of finalizing bandwidth allocation of communication will be described later.

The SIP server 2 transmits an OK message to the wireless terminal 3a (#16). At this time, the OK message contains SDP data. The SDP data contains information representing a set of multimedia type of the streams whose bandwidth was able to be allocated in the AP 1a. Thus, the wireless terminal 3a can start communication with respect to the stream whose bandwidth was able to be allocated.

The wireless terminal 3a having received the OK message transmits an ACK message to the wireless terminal 3b via the SIP server 2 (#17, #18). Because of this, communication is started between the wireless terminals 3a, 3b. This communication is performed in accordance with, for example, RTP/AVP (Real-time Transport Protocol using Audio Video Profile).

In this communication, the stream whose bandwidth was able to be allocated in the AP 1a is exchanged between the wireless terminals 3a, 3b. For example, in the case where the multimedia type data contained a stream whose multimedia type is an audio and a stream whose multimedia type is a video are allocated in the AP 1a, an audio stream and a video stream are exchanged between the wireless terminals 3a, 3b. Since streams are transmitted as packets, the AP 1a determines whether or not streams are relayed by priority for each packet to be relayed.

In the case where a user of one of the wireless terminals 3a, 3b requests the ending of the communication, a BYE message requesting the ending of the communication is transmitted from that wireless terminal to the SIP server 2. In the example shown in FIG. 5, the wireless terminal 3a transmits a BYE message (#19). The SIP server 2 having received the BYE message transmits the BYE message to the wireless terminal 3b (#20). The wireless terminal 3b having received the BYE message transmits an OK message representing that the ending of the communication is accepted to the SIP server 2 (#201).

The SIP server 2 having received the OK message requests the AP 1a to deallocate the bandwidth allocated for communication (#202). The AP 1a deallocates the allocated bandwidth by deleting communication identification data and required bandwidth data of the corresponding communication from the priority data recording part 13. The SIP server 2 further transmits the OK message to the wireless terminal 3a (#203). Consequently, the communication between the wireless terminals 3a and 3b is ended.

The example shown in FIG. 5 corresponds to the processing in the case where both the wireless terminals 3a, 3b can access the AP 1a. In the case where the wireless terminals 3a, 3b respectively access the APs (e.g., the AP 1a and AP 1b), the processings of the AP 1a and the SIP server 2 shown in FIG. 5 (#8, #9, #15, #202) are performed with respect to the respective APs 1a, 1b. At this time, the SIP server 2 can request the respective APs 1a, 1b to allocate bandwidths so that the bandwidth allocated in the AP 1a becomes the same as the bandwidth allocated in the AP 1b.

(Processing of Bandwidth Reservation)

Figure 6:
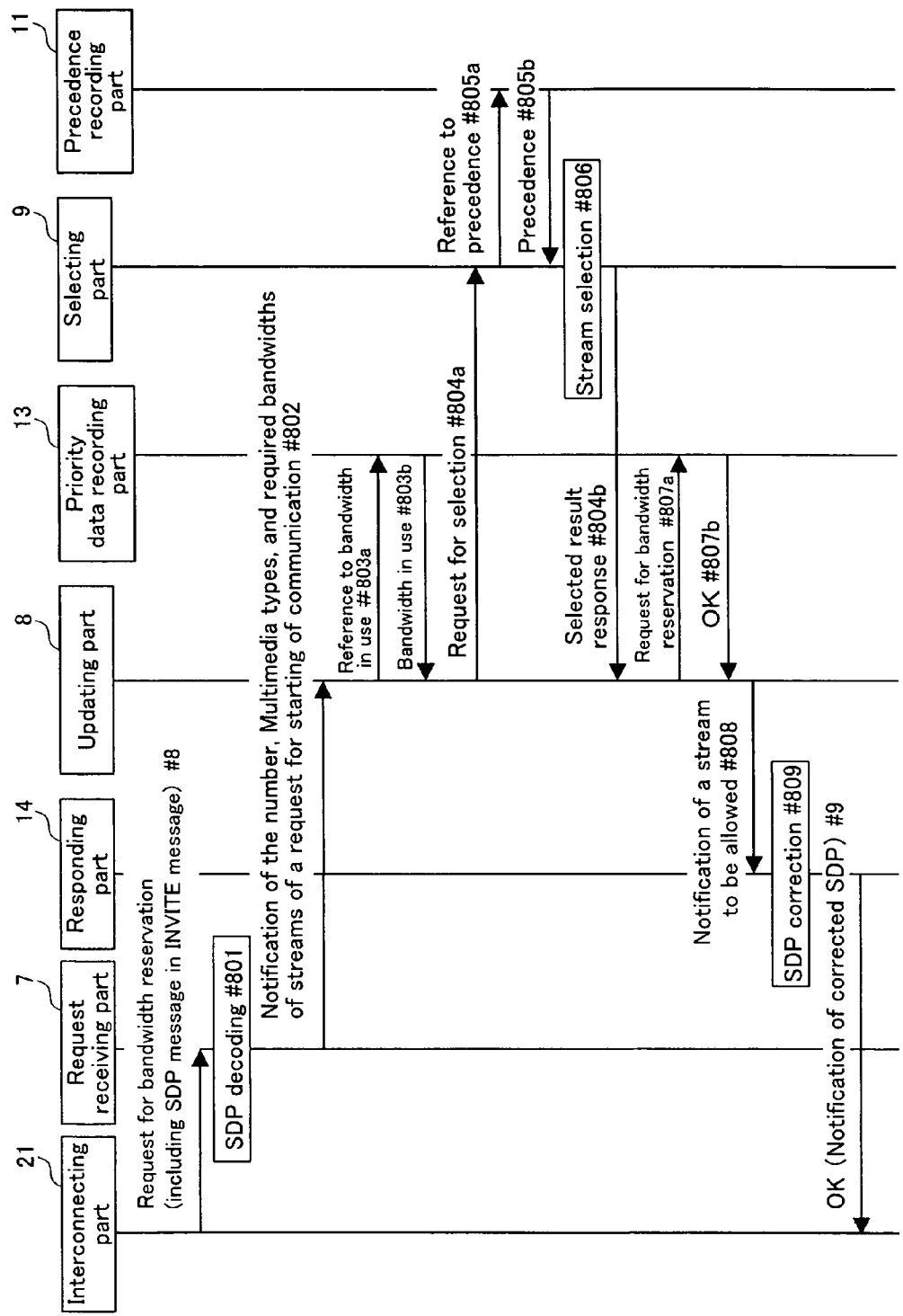

FIG. 6 is a sequence diagram showing an example of processing when the request for a bandwidth reservation is transmitted from the SIP server 2 to the AP 1a in #8 shown in FIG. 5. More specifically, the processing shown in FIG. 6 is exemplary processing in the case where the SIP server 2 having received an INVITE message requesting the starting of communication from the wireless terminal 3a requests the AP 1a to reserve bandwidth allocation for the communication. In FIG. 6, first, the interconnecting part 21 of the SIP server 2 requests the request receiving part 7 of the AP 1a to reserve a bandwidth of communication ready to be started (#8). At this time, the interconnecting part 21 transmits SDP data contained in the INVITE message received from the wireless terminal 3a to the AP 1a.

The request receiving part 7 decodes the received SDP data, and reads communication identification data for identifying the communication ready to be started. The communication identification data is, for example, an IP address of the wireless terminal 3a and an IP address of the wireless terminal 3b.

Furthermore, the request receiving part 7 decodes the received SDP data (#801), and generates data representing the number of streams included in the communication, multimedia types, and a required bandwidth of a stream for each multimedia type. FIGS. 7A and 7B show specific examples of a part of the SDP data. FIG. 7A represents an example of a portion of data representing a stream included in the communication ready to be started, among the SDP data received by the request receiving part 7.

In the SDP data shown in FIG. 7A, each stream included in the communication is represented by a character string representing a stream. Each stream is identified by a stream ID. For example, "m=audio" in the first line represents that the multimedia type is an audio. "49170" represents a port number for transmitting/receiving the stream, and is used as an stream ID for identifying the stream, in combination with a transmission origin/reception destination address. "RTP/AVP" represents a communication protocol of the stream, and "0" represents a compression form (codec) of the stream, respectively. The request receiving part 7 can generate data representing that the number of streams included in the communication is 2, and the multimedia types of the streams included in the communication are an audio and a video, from the data shown in FIG. 7A.

Furthermore, the request receiving part 7 determines each required bandwidth for the stream whose multimedia type is an audio and the stream whose multimedia type is a video. The required bandwidth can be determined, for example, using a required bandwidth previously recorded with respect to each multimedia type. FIG. 8 shows an example of a required bandwidth table 35 for recording a required bandwidth with respect to each multimedia type. For example, the required bandwidth table 35 as shown in FIG. 8 is previously recorded in the AP 1a. The request receiving part 7 can determine that a bandwidth required for relaying the stream whose multimedia type is an audio is 128 and a bandwidth required for relaying the stream whose multimedia type is a video is 420, by referring to the required bandwidth table 35.

In the present embodiment, as an example, the required bandwidth of particular communication in the AP is a value representing to which degree a communication amount by the particular communication occupies among the maximum communication amount per unit time capable of being relayed by the AP. As an example of this value, in the case where the communication amount per unit time of an audio stream is 128 kbps when the link speed between the AP and a certain terminal (A communication mode determined between the terminal and the AP. For example, in IEEE 802.11b, there are 1 Mbps, 2 Mbps, 5.5 Mbps, and 11 Mbps communication modes, and each of them represents a logically maximum communication amount) is 11 Mbps, the required bandwidth of 128 kbps is determined. This means that 128 k/11 M among the logically maximum communication amount capable of being relayed by the AP is used for relaying an audio stream. In this case, when the link speed between the AP and the terminal changes, the value of the required bandwidth is converted to a value at 11 Mbps in accordance with the link speed. For example, in the case where the required bandwidth of an audio stream is 128 kbps at the link speed of the AP of 11 Mbps, when the link speed between the AP and the terminal changes to 5.5 Mbps, the maximum communication amount per unit time capable of being performed by the AP and the terminal becomes a half that at a time of the link speed of 11 Mbps. Therefore, the required bandwidth at a time of the link speed of 5.5 Mbps is converted to 256 kbps that is a double of the required bandwidth at a time of the link speed of 11 Mbps.

Even at the link speed of 11 Mbps, because of the influence of the physical performance of a relay apparatus, an access system, and the like, the maximum throughput that can be used actually varies depending upon the type of a relay apparatus. Thus, the upper limit value of a bandwidth allocated to the communication to be relayed by priority is calculated based on the value representing the performance of the type of the relay apparatus. For example, in the case of the type capable of generating an effective throughput of 5 Mbps, 5 Mbps can be set to the upper limit value of a bandwidth allocated to the communication to be relayed by priority.

The method for representing a required bandwidth is not limited to the above method. For example, the ratio at which a frequency bandwidth to be used for the particular communication occupies among the frequency bandwidths that can be used for the communication between the AP and the terminal may be represented as a required bandwidth for the communication.

The request receiving part 7 gives data representing the number of streams included in the communication, the multimedia types of the streams included in the communication, and the required bandwidth of each multimedia type, generated from the SDP data as described above, to the updating part 8 (#802). The updating part 8 obtains a bandwidth that is being used by the communication relayed by priority or a bandwidth to be used, with reference to the priority data recording part 13 (#803a, #803b). The bandwidth is represented by, for example, a sum of bandwidths represented by required bandwidth data recorded in the priority data recording part 13. For example, the sum of bandwidths represented by the required bandwidth data recorded in the priority table 31 shown in FIG. 3 becomes 128+420+128=676.

When the updating part 8 obtains the bandwidth in use, the updating part 8 calculates a usable bandwidth, using the obtained the bandwidth in use. The usable bandwidth is obtained, for example, by calculating the difference between the bandwidth in use and a predetermined upper limit value. For example, in the case where the obtained bandwidth in use is the above-mentioned 676, and the predetermined upper limit value is 1000, the usable bandwidth becomes 1000−676=324.

The predetermined upper limit value used for calculating the usable bandwidth may be, for example, the maximum value of a bandwidth that can be used for wireless communication by the AP 1a, or may be a value obtained by subtracting a predetermined required available bandwidth from the maximum value. Furthermore, the updating part 8 may update a required available bandwidth depending upon the situation. An example in which a required available bandwidth is changed depending upon a common use will be described later.

The updating part 8 having obtained the usable bandwidth compares a required bandwidth for each multimedia type of a stream included in the communication with the usable bandwidth. The updating part 8 determines whether or not the required bandwidth required for relaying all the streams included in the communication exceeds the usable bandwidth. For example, in the case where the communication includes a stream whose multimedia type is an audio and a stream whose multimedia type is a video, the bandwidth required for the communication of an audio stream and a video stream becomes 128+420=548 in the above example. On the other hand, since the usable bandwidth is 324 in the above example, it is determined that the required bandwidth exceeds the usable bandwidth in this case.

If the required bandwidth exceeds the usable bandwidth, the selecting part 9 is requested to select the multimedia type of a stream to be relayed by priority (#804a). If the required bandwidth does not exceed the usable bandwidth, a bandwidth is reserved (#807a) without requesting selection (without performing the processings in #804a to 806).

The selecting part 9 having received a request for selection obtains a precedence of the multimedia type (#805b), with reference to the precedence recording part 11 (#805a). The selecting part 9 selects a multimedia type in a range where the required bandwidth does not exceed the usable bandwidth, in the order from the obtained multimedia type having the highest precedence (#806). For example, in the case where the data recorded in the precedence recording part 11 is the multimedia priority table 32 shown in FIG. 4, and the multimedia types of streams included in the communication are an audio and a video, the selecting part 9 determines whether or not the required bandwidth of an audio having a high priority exceeds the usable bandwidth. In this case, the required bandwidth (128 in the present example) of an audio does not exceed the usable bandwidth (324 in the present example), so that the selecting part 9 selects an audio. Similarly, determination is also made with respect to a video. The required bandwidth (420 in the present example) of a video exceeds a bandwidth (324−128=196 in the present example) excluding the required bandwidth of an audio from the usable bandwidth, so that a video is not selected.

The selecting part 9 notifies the updating part 8 of a selection result (#804b). Herein, the selecting part 9 notifies the updating part 8 that the selecting part 9 has selected only an audio among multimedia types i.e., an audio and a video) of streams included in the communication. The updating part 8 records data that represents a required bandwidth of a stream of the multimedia type selected by the selecting part 9, and the communication identification data in the priority data recording part 13. In the present example, the required bandwidth (128) of an audio stream and the communication identification data (an IP address of the wireless terminal 3a and an IP address of the wireless terminal 3b) are recorded in the priority data recording part 13. Furthermore, as data representing the state of the priority data recording part 13, data representing "reservation" is recorded. Consequently, bandwidth allocation for relaying only communication of an audio by priority is reserved. When the updating part 8 is notified of the completion of data recording (#807b), the updating part 8 notifies the responding part 14 of the multimedia type reserved for the bandwidth allocation. More specifically, the responding part 14 is notified of the multimedia type (an audio in the present example) selected by the selecting part 9 (#808).

The responding part 14 corrects the SDP data received by the request receiving part 7 so that the multimedia type of the stream reserved for bandwidth allocation is represented as the SDP data. For example, the responding part 14 leaves only information representing the stream reserved for bandwidth allocation, among information representing the streams of the SDP data, and deletes information representing the other streams. FIG. 7B shows a state in which the SDP data shown in FIG. 7A is corrected, and only the information representing the stream reserved for bandwidth allocation is left. Information representing a stream whose multimedia type is an audio "m=audio" is left, and information representing a stream whose multimedia type is a video "m=video" is deleted. In the case where the selecting part 9 does not select a multimedia type, the SDP data is not corrected.

The responding part 14 transmits the SDP data thus corrected to the interconnecting part 21 of the SIP server 2 together with an OK message. The interconnecting part 21 receives the OK message and the SDP data, as a response to the request for a bandwidth reservation (#9). Because of this, the SIP server 2 can obtain data representing that a bandwidth can be allocated by the AP 1a only with respect to the communication of a stream whose multimedia type is an audio.

The processing shown in FIG. 6 is an example, and the reservation processing of bandwidth allocation by the AP is not limited to the example shown in FIG. 6.

(Processing of Bandwidth Allocation)

Figure 9:
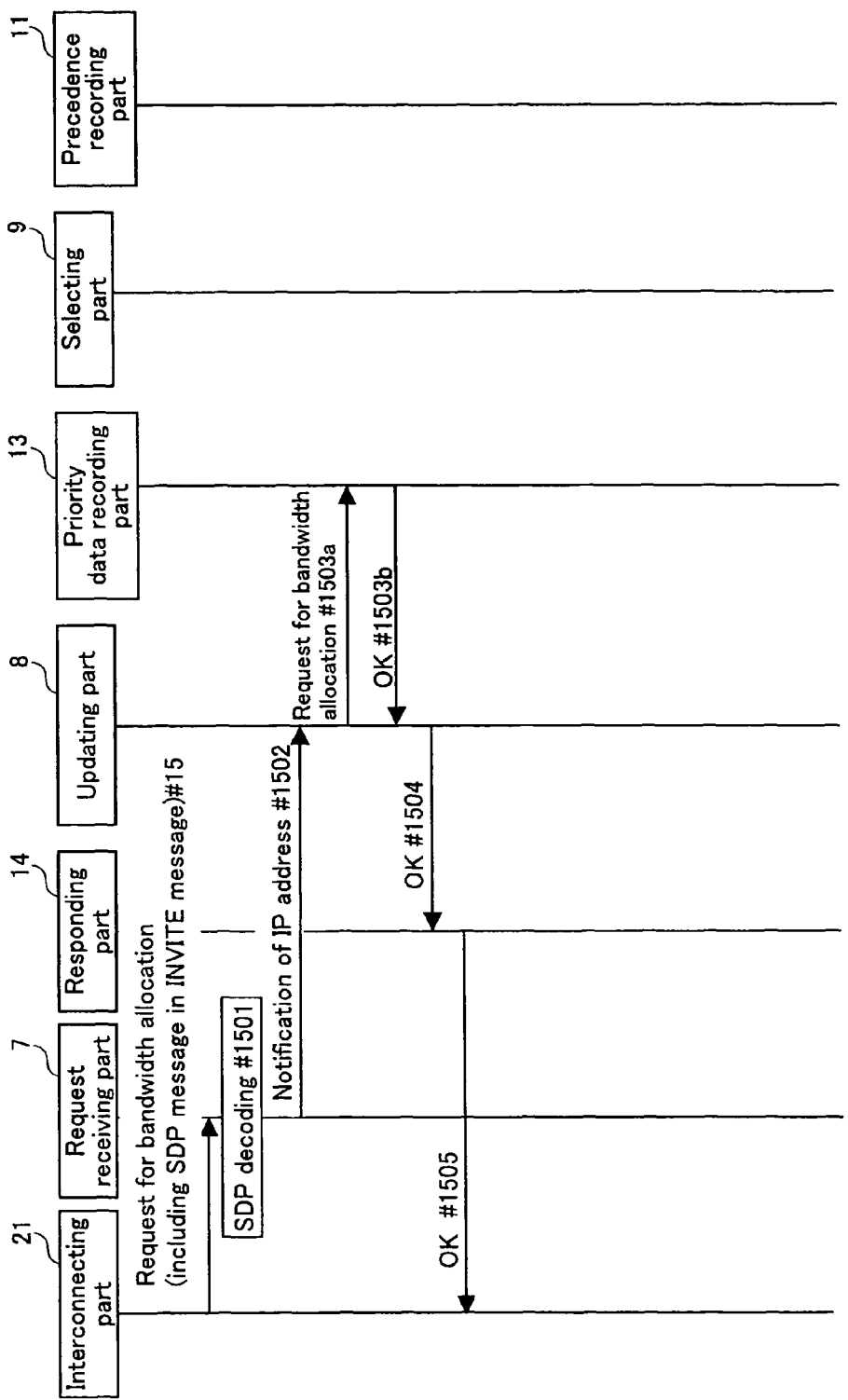

FIG. 9 is a sequence diagram showing an example of processing when a request for bandwidth allocation is transmitted from the IP server 2 to the AP 1a in #15 shown in FIG. 5. The processing shown in FIG. 9 is an example of processing after the processing of reserving bandwidth allocation shown in FIG. 6 is performed by the AP 1a. More specifically, the processing shown in FIG. 9 is an example of processing in the case where the SIP server 2 having received an OK message of accepting the starting of communication from the wireless terminal 3b requests the AP 1a to allocate a bandwidth that has already been reserved for the communication. In FIG. 9, first, the interconnecting part 21 of the SIP server 2 requests the request receiving part 7 of the AP 1a to allocate a bandwidth of the communication ready to be started (#15). At this time, the interconnecting part 21 transmits communication identification data of the communication ready to be started and SDP data contained in the OK message received from the wireless terminal 3b to the AP 1a. The request receiving part 7 decodes the received SDP data to read the communication identification data for identifying the communication ready to be started (#1501). The communication identification data is, for example, an IP address of the wireless terminal 3a and an IP address of the wireless terminal 3b. The request receiving part 7 gives the read IP addresses to the updating part 8 (#1502). The updating part 8 updates the state of the communication represented by the IP addresses given from the request receiving part 7 from "reservation" to "under communication", among the data recorded in the priority data recording part 13. Consequently, the allocation of a bandwidth is completed (#1503a).

When the updating part 8 receives the notification of the completion of update from the priority data recording part 13 (#1503b), the updating part 8 gives an OK message, stating that a bandwidth has been allocated, to the responding part 14 (#1504), and the responding part 14 transmits a response, stating that a bandwidth has been allocated, to the interconnecting part 21 of the SIP server 2 (#1505).

Owing to the above processings, a bandwidth is allocated. The priority control part 15 of the AP 1a relays, by priority, the communication whose state is under communication, with reference to the priority data recording part 13. Thus, when the communication of an audio stream is started between the wireless terminal 3a and the wireless terminal 3b, the communication is relayed by priority, compared with the other communications recorded in the priority data recording part 13 in the AP 1a.

(First Modified Example of Multimedia Type Selection Processing)

Hereinafter, a modified example of the processing will be described in which the selecting part 9 selects a multimedia type in #806 of the processing shown in FIG. 6. FIG. 10 shows an example of data to be recorded in the precedence recording part 11 to which the selecting part 9 refers in the first modified example. As shown in FIG. 10, in the precedence recording part 11 in the modified example, a multimedia type combination table 36, a multimedia priority table A, a multimedia priority table B, and a multimedia priority table C are recorded. The multimedia type combination table 36 stores the data representing combination patterns of multimedia types of streams included in the communication, and the data representing multimedia priority tables to be referred to so that they are associated with each other for each combination of the multimedia types.

The selecting part 9 obtains data representing a multimedia priority table corresponding to a combination of multimedia types of streams included in the communication ready to be started, with reference to the multimedia type combination table 36. For example, in the case where multimedia types of streams included in the communication ready to be started are an audio and a character, the selecting part 9 obtains data representing the corresponding multimedia priority table A with reference to the multimedia type combination table 36. The selecting part 9 selects an audio or a character, with reference to the priority of multimedia types in the multimedia priority table A.

Thus, by providing a multimedia priority table for each combination of multimedia types of streams included in the communication, the priority of multimedia types can be changed depending upon the combination of multimedia types of streams included in the communication ready to be started. For example, in the case of the communication including streams of a right audio and a left audio of a stereo audio, and a video stream, as shown in the multimedia priority table C, a right audio, a video, and a left audio can be relayed by priority in this order. Furthermore, as another example, in the case of communicating pointing position information of a pen tablet and presentation information containing an audio and a video by streaming, an audio, pointing information, and a video can be relayed by priority in this order. In the case of the presentation, a video is a still picture in most cases, so that a problem is unlikely to occur even if a delay occurs in the communication of a video, and a priority may be decreased.

(Second Modified Example of Multimedia Type Selection Processing)

Herein, another modified example of the processing in which the selecting part 9 selects a multimedia type will be described. FIG. 11 shows an example of data to be recorded in the precedence recording part 11 to which the selecting part 9 refers in the second modified example. As shown in FIG. 11, the precedence recording part 11 in the present modified example stores a terminal type table 37, a multimedia priority table for a telephone 38*a*, a multimedia priority table for a camera 38*b*, and a multimedia priority table for a TV conference system 38*c*. The terminal type table 37 stores information regarding a terminal that is ready to communicate, and data representing a multimedia priority table to be referred to so that they are associated with each other.

The selecting part 9 obtains information regarding a wireless terminal that is ready to communicate from the SDP data received by the request receiving part 7. Examples of the information regarding the terminals include data representing a product name or a specification name. The selecting part 9 obtains data representing a multimedia priority table corresponding to a terminal that performs communication ready to be started, with reference to the terminal type table 37. For example, in the case where a terminal that performs communication ready to be started is a telephone, the selecting part 9 obtains data representing the corresponding multimedia priority table for a telephone 38*a* with reference to the terminal type table 37. The selecting part 9 selects a set of multimedia types with reference to the priority of multimedia types of the multimedia priority table for a telephone 38*a*.

Because of this, in the case where a terminal that performs communication is a telephone, an audio, a character, and a video are relayed by priority in this order. This is because, in the communication by a telephone, the transmission of an audio is important in most cases. Furthermore, for example, in the case of transmitting an image of a monitoring camera, or the like, the transmission of a video is more important than that of an audio. Therefore, the priority of a video can be set to be higher than that of an audio, as in the multimedia priority table for a camera 38*b*. Thus, by providing a multimedia priority table for each terminal type, the priority of multimedia types can be changed depending upon the type of a terminal that is ready to start communication.

(Method for Setting a Predetermined Required Available Bandwidth)

Herein, a modified example of the processing will be described in which an upper limit value used for obtaining a usable bandwidth is determined after the updating part 8 obtains the bandwidth in use (#803*b*) in the processing shown in FIG. 6 will be described. The upper limit value is a maximum value of a bandwidth that can be allocated to communication to be relayed by priority. The difference between the upper limit value and the bandwidth in use is a usable bandwidth. In the present modified example, as an example, the updating part 8 obtains the upper limit value by the following expression.

Upper limit value=Maximum value of a bandwidth that can be used by the *AP* 1*a* for wireless communication−Required Available Bandwidth Herein, the required available bandwidth is a bandwidth required to be left without being allocated to the communication to be relayed by priority, among the bandwidths that can be used by the AP 1*a* for wireless communication. By leaving an available bandwidth at all times, a bandwidth can be always allocated to the communication other than the communication to be relayed by priority. In the present modified example, a required available bandwidth uses a value varied depending upon a required bandwidth required for relaying communication ready to be started.

For example, in the case where it is desired to allocate a certain number or more audio communications, the following setting is performed. The updating part 8 can determine a required available bandwidth with reference to a required available bandwidth table 41 as shown in FIG. 12. The required available bandwidth table 41 stores data representing a range of a required bandwidth required for relaying communication ready to be started and data representing a required available bandwidth so that they are associated with each other. In the example shown in FIG. 12, in the case where the required bandwidth is 200 or less, the required available bandwidth is equal to a required bandwidth. The required available bandwidth in the case where the required bandwidth is 201 to 400 is set to be 800, the required available bandwidth in the case where the required bandwidth is 401 to 800 is set to be 1600, and the required available bandwidth in the case where the required bandwidth is 801 or more is set to be 128×average number of telephone conversations. As the average number of telephone conversations, the average value of the number of telephone conversations relayed by the AP on a daily basis is used.

The updating part 8 uses the required available table 41 as shown in FIG. 12, thereby increasing the required available bandwidth as the required bandwidth is larger. For example, the communication including a video with a large required bandwidth, and the like as multimedia types can be set so as not to be relayed by priority, if there is no large available bandwidth. Because of this, the available bandwidth of the AP can be prevented from being occupied by a small number of communications that use a large bandwidth.

In the above embodiment, the case has been described in which a communication control apparatus that controls the communication of a wireless terminal is an SIP server. However, the communication control apparatus is not limited to the SIP server, and may be a communication control apparatus that starts/ends the communication between terminals in a network. Furthermore, as an operation example, an exemplary case has been described in which the wireless terminals start/end the communication of an audio and a video. However, the communication relayed by the AP is not limited to that between wireless terminals. For example, even in the case where the communication between a wireless terminal and a server connected to a wired network is started, the bandwidth of the communication can be allocated for each multimedia type in the AP.

Embodiment 2

In Embodiment 1, the selecting part 9 selects some of a plurality of streams included in communication in accordance with a multimedia type. In Embodiment 2, regarding a plurality of streams included in communication, the priority of communication quality of each stream is varied depending upon a multimedia type.

Figure 13:
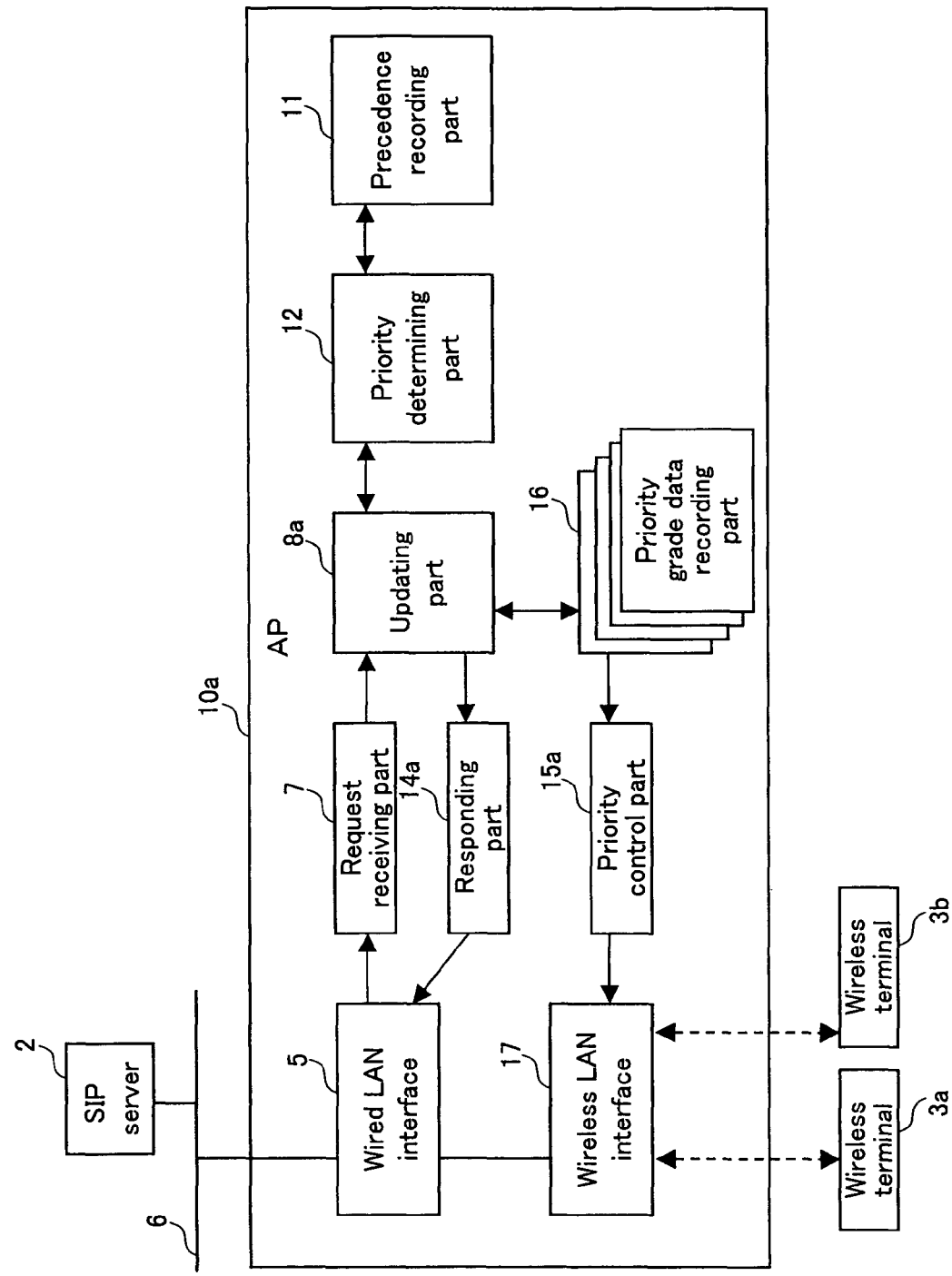
FIG. 13 is a functional block diagram showing a detailed configuration of an AP 10a according to Embodiment 2.

FIG. 13 is a functional block diagram showing a detailed configuration of an AP 10*a* in Embodiment 2. In FIG. 13, the same functional blocks as those in FIG. 2 are denoted with the same reference numerals as those therein, and the description thereof will be omitted.

The AP 10*a* shown in FIG. 13 includes a priority grade data recording part 16 instead of the priority data recording part 13 shown in FIG. 2. Furthermore, the AP 10a includes a priority determining part 12 instead of the selecting part 9 shown in FIG. 2.

A plurality of the priority grade data recording parts 16 are provided for respective stages of priorities in a plurality of stages. Each priority grade data recording part 16 stores stream identification data for identifying a stream to be relayed by priority, and required bandwidth data representing a bandwidth required for relaying the stream by priority.

FIG. 14 shows a specific example of data recorded in each priority grade data recording part 16 provided for each priority. FIG. 14 shows a first priority table representing an example of data recorded in the priority grade data recording part 16 with a priority of "1", and a second priority table representing an example of data recorded in the priority grade data recording part 16 with a priority of "2". The first priority table 39a and the second priority table 39b store data representing a source IP address, a destination IP address, a port number, a state, and a required bandwidth so that they are associated with each other for each stream to be relayed by priority.

The source IP address, the destination IP address, and the port number are one exemplary stream identification data representing a stream to be relayed by priority. The stream relayed by priority is specified by the source IP address, the destination IP address, and the port number. The state is data representing the communication state of the stream represented by the stream identification data. The required bandwidth is data representing a bandwidth required for relaying the stream specified by the stream identification data (the source IP address, the destination IP address, and the port number).

FIG. 14 shows the case where the priority grade data recording parts 16 are provided with respect to two stages of the priorities of "1" and "2"; however, the priority is not limited two stages. Furthermore, the stream identification data is not limited to the source IP address, the destination IP address, and the port number.

A priority control part 15a controls the wireless LAN interface 17 and allows it to relay the communication of a stream specified by the communication identification data and the multimedia identification data recorded in the priority grade data recording part 16 with higher priority, by further priority compared with the communication of a stream represented by the communication identification data recorded in the priority grade data recording part 16 with lower priority, among a plurality of priority grade data recording parts 16. For example, the priority control part 15a allows the stream specified by the source IP address, the destination IP address, and the port number recorded in the first table shown in FIG. 14 to be relayed by further priority compared with the stream specified by the source IP address and the destination IP address port number recorded in the second priority table.

The request receiving part 7 receives a request for relaying, by priority, the communication of a wireless terminal ready to be started from the interconnecting part 21 of the SIP server 2. At this time, the request receiving part 7 receives communication identification data representing communication to be relayed by priority and multimedia based data representing multimedia types of one or a plurality of streams.

The priority determining part 12 determines the priority regarding a stream of each multimedia type represented by the multimedia type data received by the request receiving part 7, based on the precedence recorded in the precedence recording part 11.

The updating part 8 records the stream identification data, the state, and the required bandwidth data in the priority grade data recording part 16 in accordance with the priority determined by the priority determining part 12, regarding a stream of each multimedia type represented by the multimedia type data. A responding part 14a transmits a response to the request received by the request receiving part 7 to the SIP server 2.

Next, the operation example of the wireless communication system in the present embodiment in the case where communication by wireless terminals is performed will be described. The processing flow of the entire wireless communication system in the case where communication by the wireless terminals is performed is the same as that shown in FIG. 5.

Figure 15:
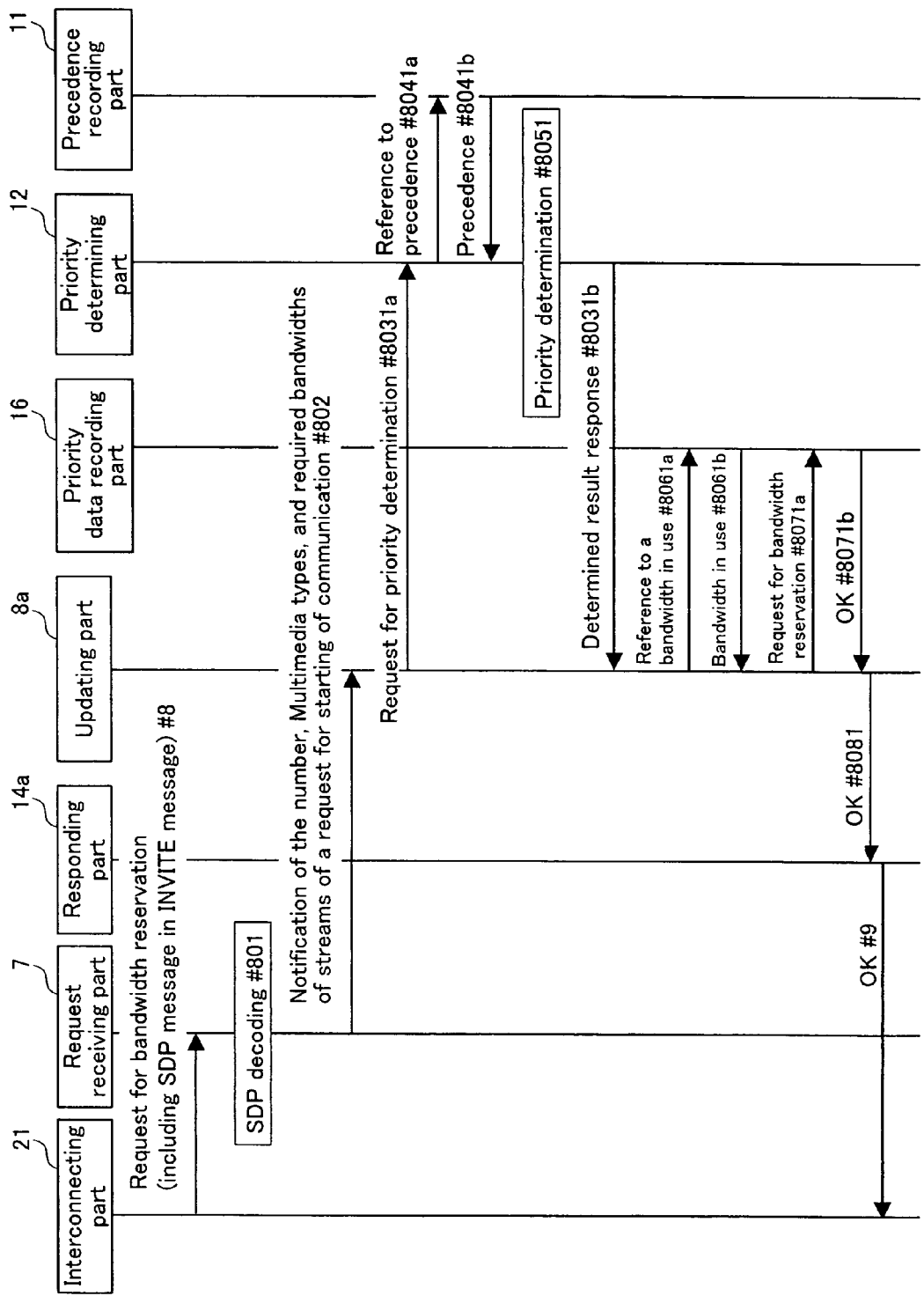
FIG. 15 is a sequence diagram showing an example of processing when a request for a bandwidth reservation is transmitted to an AP.

FIG. 15 is a sequence diagram showing an example of the processing when a request for bandwidth reservation is transmitted from the SIP server 2 to the AP 10a in #8 shown in FIG. 5. More specifically, the processing shown in FIG. 15 is an example of the processing in the case where the SIP server 2 having received an INVITE message requesting the starting of communication from the wireless terminal 3a requests the AP 10a to reserve bandwidth allocation for the communication. In the processing shown in FIG. 15, the same processing as that shown in FIG. 6 is denoted with the same reference numerals as those therein, and the description thereof will be omitted.

In FIG. 15, the processings in #8 to #802 are the same as those shown in FIG. 6. In #8031a, an updating part 8a requests the priority determining part 12 to determine the priority of a stream to be relayed by priority. For example, in the case where the updating part 8a has received an audio and a video as multimedia types of streams included in communication from the request receiving part 7, the updating part 8a requests the priority determining part 12 to determine the priority of an audio and the priority of a video. The priority determining part 12 refers to the precedence recording part 11 (#8041a), and obtains the priority of a multimedia type for each stream included in communication (#8041b).

The priority determining part 12 determines the priority of a stream for each multimedia type based on the obtained priority (#8051). For example, in the case where the data recorded in the precedence recording part 11 is the multimedia priority table 32 shown in FIG. 4, and the multimedia types of streams included in the communication are an audio and a video, the priority determining part 12 determines the priority of an audio to be "1" and the priority of a video to be "2". The priority determining part 12 notifies the updating part 8a of the determined priority (#8031b).

The updating part 8a refers to the priority grade data recording part 16 provided for each priority in a plurality of stages (#8061a), thereby obtaining a bandwidth that is being used by the stream to be relayed by priority or a bandwidth to be used, regarding the respective priorities in plurality of stages (#8061b). For example, the updating part 8a obtains, as a bandwidth of the communication with the priority of "1", the sum (128+420+128=676) of bandwidths represented by the required bandwidth data recorded in the first priority table 39a shown in FIG. 14. Furthermore, the updating part 8a obtains, as a bandwidth of the communication with the priority of "2", the sum (128+128=256) of the bandwidths represented by the required bandwidth data recorded in the second priority table 39b.

When the updating part 8a has obtained the bandwidth for each priority, the updating part 8a calculates a usable bandwidth for each priority, using the obtained bandwidth in use. The usable bandwidth is obtained, for example, based on the difference between the bandwidth in use of each priority and a predetermined upper limit value. Herein, the predetermined upper limit value may be varied depending upon each priority, or may be the same.

For example, in the case where the bandwidth of the communication with the priority of "1" is 676, and the predetermined upper limit value with the priority of "1" is 1000, the bandwidth of the communication with the priority of "1" becomes 1000−676=324. Furthermore, in the case where the bandwidth of the communication with the priority of "2", and the predetermined upper limit value with the priority of "2" is 1000, the usable bandwidth of the communication with the priority of "2" becomes 1000−256=744.

The updating part 8*a* having obtained the usable bandwidth for each priority compares the usable bandwidth of each priority with the required bandwidth of a stream of a multimedia type having a corresponding priority. If the bandwidth in use is large, the updating part 8*a* records the stream identification data, the state, and the required bandwidth of the corresponding multimedia type in the priority grade data recording part 16 with that priority.

For example, in the case where the priority of an audio is "1", and the priority of a video is "2", the updating part 8*a* compares the usable bandwidth of the communication with the priority of "1" with the required bandwidth of an audio stream. If the usable bandwidth is larger, the updating part 8*a* registers information regarding the audio stream in the first priority table 39*a* of the priority of "1". The updating part 8*a* compares the usable bandwidth of the communication with the priority of "2" with the required bandwidth, regarding a video stream. If the usable bandwidth is larger, the updating part 8*a* records data regarding the stream in the first priority table 39*a* of the priority of "1". Thus, bandwidth allocation is reserved (#8071*a*).

In the above example, the audio stream is relayed by priority, and the video stream is relayed to a wireless terminal although the relay priority is lower than that of the audio. Therefore, the video stream is relayed even in slightly delay from the audio stream. Thus, at the wireless terminal, first, a required audio is relayed by priority, whereby at least conversation can be performed smoothly even with the degradation in quality and the delay of a video.

In the case where the usable bandwidth is smaller than the required bandwidth, the allocation of a bandwidth may be reserved for each priority of a multimedia type, or bandwidths may be allocated in stages as follows.

More specifically, in a certain priority, in the case where the required bandwidth required for relaying a stream exceeds the usable bandwidth, the updating part 8*a* compares the required bandwidth required for relaying a stream of that priority with the usable bandwidth at a priority lower by one stage. If the required bandwidth does not exceed the usable bandwidth of a priority lower by one stage, bandwidth is reserved with that priority. Because of this, for example, even if the stream of a multimedia type determined to be the priority of "1" in the priority determining part 12 has not been reserved for bandwidth allocation due to the shortage of a bandwidth in the first priority table 39*a* of the priority of "1", there is a possibility that bandwidth allocation may be reserved in the second priority table 39*b* of the priority "2". Thus, by comparing the required bandwidth with the usable bandwidth by decreasing the priority by one stage until bandwidth allocation is reserved, the priority that can be reserved is determined.

The stream identification data of a stream that cannot be reserved even by decreasing the priority to a lowest level, i.e., a stream that cannot be recorded even in the priority grade data recording part 16 of any priority may be recorded in, for example, a separately provided non-priority table. The priority control part 15 can ensure the relay although it does not relay, by priority, the stream of stream identification data recorded in a non-priority table. Because of this, the communication of a stream can be started under the condition that the relay is ensured while the quality of communication is not ensured.

When bandwidth allocation is reserved, and the updating part 8*a* has received the notification of the completion of data recording (#8071*b*), the updating part 8*a* notifies the responding part 14*a* that the bandwidth allocation has been reserved (#8081). The responding part 14*a* transmits an OK message to the interconnecting part 21 of the SIP server 2. The interconnecting part 21 receives an OK message as a response to the request for bandwidth reservation (#9). Because of this, the SIP server 2 can obtain a response showing that a bandwidth can be allocated by the AP 1*a*.

The processing shown in FIG. 15 is an example, and the processing of reserving bandwidth allocation by the AP is not limited to the example shown in FIG. 15. The updating part 8*a* determines, for example, whether or not both the stream of the multimedia type whose priority is determined to be "1" by the priority determining part 12 and the stream of the multimedia type whose priority is determined to be "2" can be recorded in the first priority table 39*a* of the priority of "1". In the case where both of them cannot be recorded, the stream of the multimedia type with a priority of "2" may be recorded in the second priority table.

Embodiment 3

Figure 16:
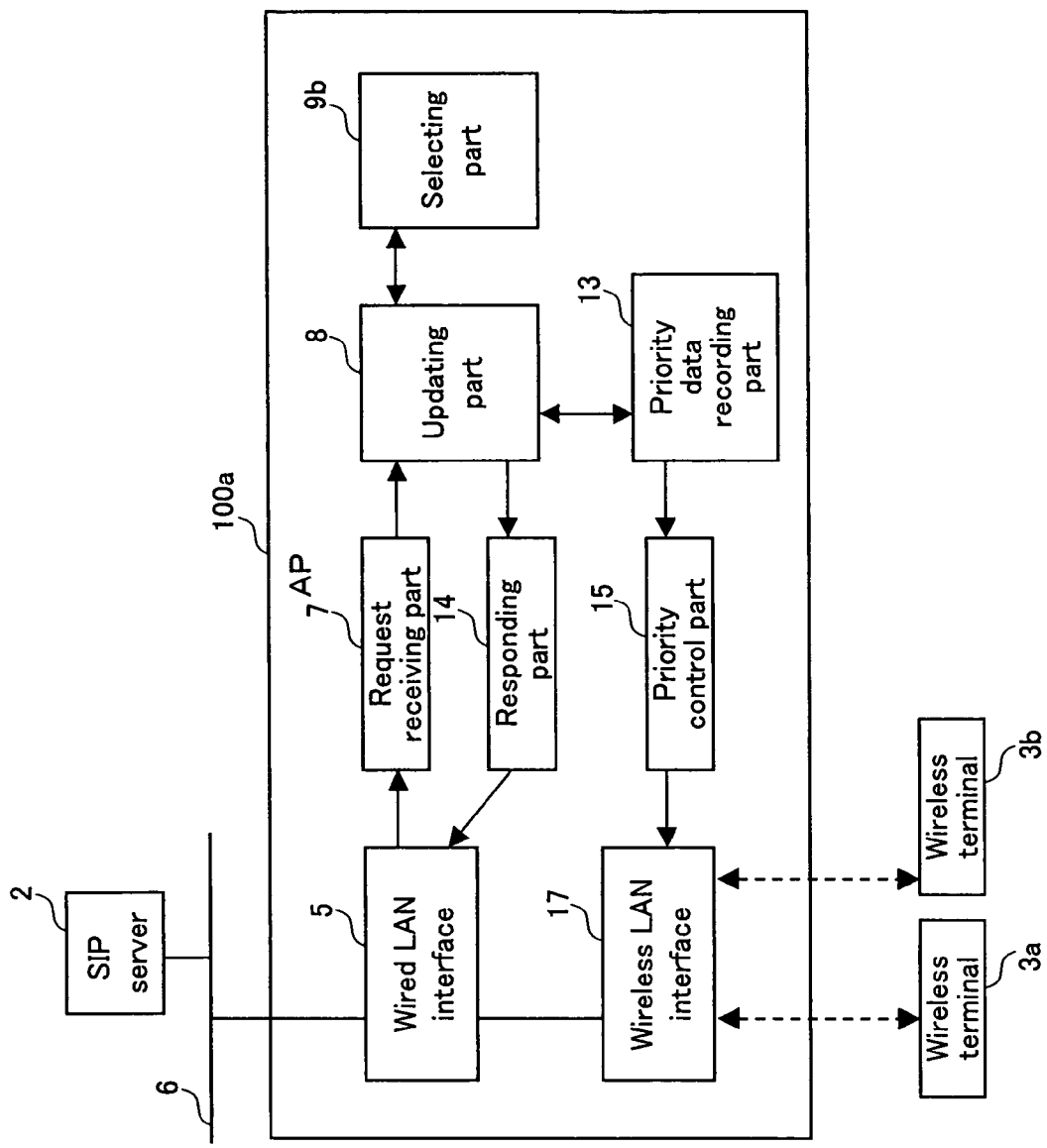
FIG. 16 is a functional block diagram showing a detailed configuration of an AP 100a according to Embodiment 3.

FIG. 16 is a functional block diagram showing a detailed configuration of an AP 100*a* according to Embodiment 3. In FIG. 16, the same functional blocks as those in FIG. 2 are denoted with the same reference numerals as those therein, and the description thereof will be omitted. The AP 100*a* shown in FIG. 16 does not have the precedence recording part 11 as shown in FIG. 2. A selecting part 9*b* shown in FIG. 16 requests a SIP server 2 to inquire of a wireless terminal that is ready to start communication about the multimedia type of a stream to be relayed by priority, instead of referring to the precedence recording part 11. The selecting part 9*b* receives, as a response from the SIP server 2, the data representing the multimedia type of a stream to be relayed by priority, and selects a multimedia type of a stream to be relayed by priority based on the received data.

Figure 17:
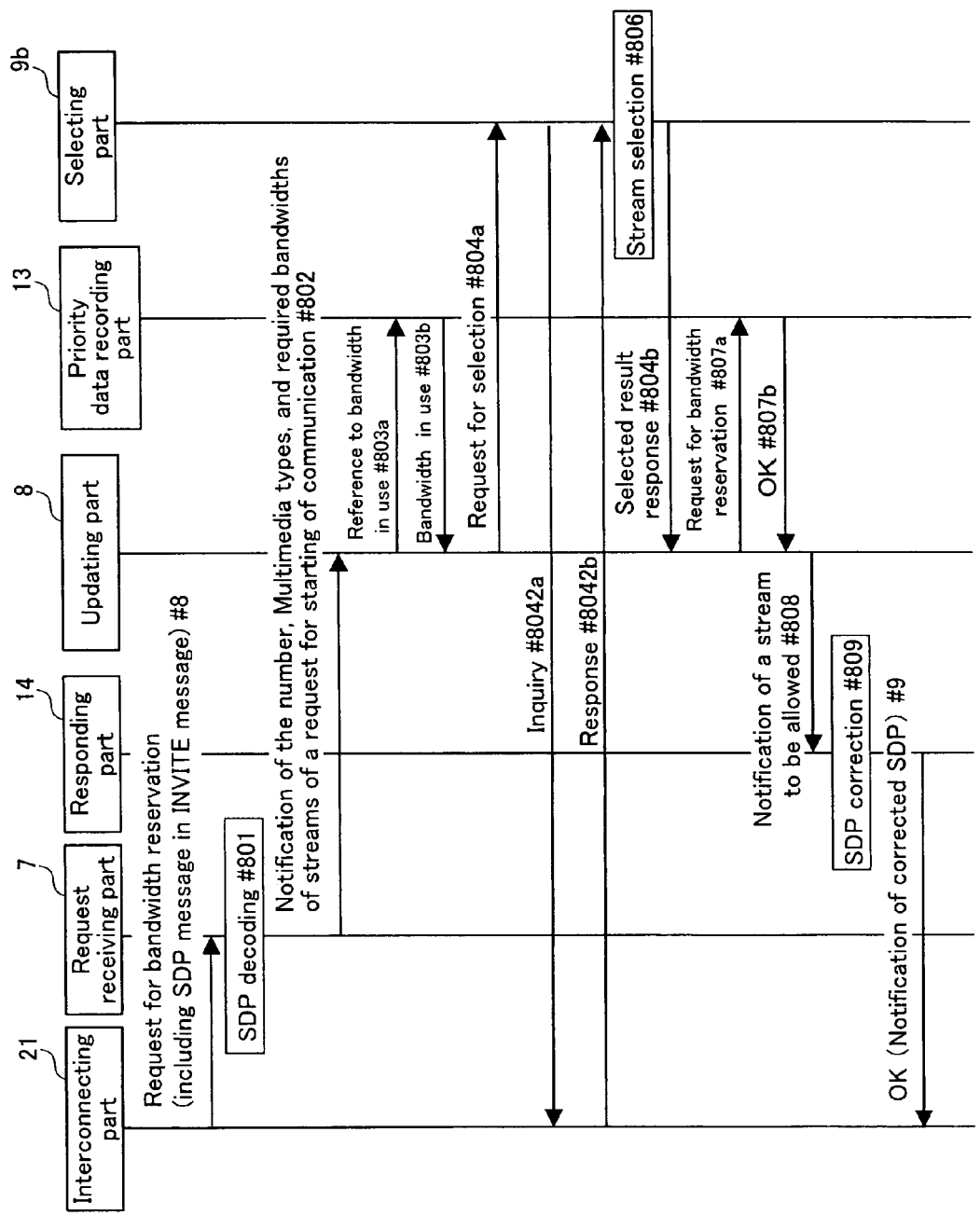

FIG. 17 is a sequence diagram showing an example of the processing in which a request for bandwidth reservation is transmitted from the SIP server 2 to the AP 100*a* in #8 shown in FIG. 5. In the processing shown in FIG. 17, the same processings as those shown in FIG. 6 are denoted with the same reference numerals as those therein, and the description thereof will be omitted.

In FIG. 17, the processings from #8 to #804*a* are the same as those shown in FIG. 6. In #8042*a*, the selecting part 9*b* requests the interconnecting part 21 of the SIP server 2 to inquire of the wireless terminal that is ready to start communication about a multimedia type. The SIP server 2 inquires of the wireless terminal 3*a* about the multimedia type of a stream to be relayed by priority. The wireless terminal 3*a* notifies the SIP server 2 of the data representing the multimedia type of a stream to be relayed by priority. The interconnecting part 21 of the SIP server 2 transmits the data representing the multimedia type of a stream to be relayed by priority to the selecting part 9*b* of the AP 100*a*. The selecting part 9*b* receives, as a response to the inquiry, the data representing the multimedia type of a stream to be relayed by priority (#8042*b*). The selecting part 9b selects the multimedia type based on the multimedia type of the received stream (#8061).

For example, the case will be described in which the multimedia types of streams included in communication ready to be started are an audio and a video, and the multimedia type: the required bandwidth of an audio is 128 and the multimedia type: the required bandwidth of a video is 420. It is assumed that a usable bandwidth is, for example, 450. In this case, although the sum of the required bandwidths of an audio and a video exceeds the usable bandwidth, the required bandwidth of either one of them does not exceed the usable bandwidth. The selecting part 9b transmits a message that inquires of the wireless terminal 3a about which of an audio or a video is relayed by priority to the interconnecting part 21 of the SIP server 2. The selecting part 9b receives, as a response to the inquiry, for example, the data representing the multimedia type in which the data representing an audio is relayed by priority. In this case, the selecting part 9b selects an audio.

Thus, by inquiring of the wireless terminal 3a that is ready to start communication about the multimedia type to be relayed by priority, the multimedia type of a stream to be relayed by priority can be selected, considering the indication of a user of the wireless terminal 3a.

In the present embodiment, the example has been described in which the selecting part 9b inquires of the wireless terminal about the stream to be relayed by priority, instead of referring to the precedence recording part 11. The selecting part 9b may select a stream with a small required bandwidth by priority, as another processing replacing the processing of referring to the precedence recording part 11.

As described above, in Embodiments 1 to 3, as an example, the configuration and the operation of an AP for a wireless LAN have been described. The wireless LAN is a specification of a short distance wireless network determined by IEEE 802.11. However, the relay apparatus of the present invention is not limited to an AP for a wireless LAN. For example, the relay apparatus of the present invention can also be applied to the AP for a wireless MAN that is a specification of a long distance wireless network determined by WiMAX.

The present invention can be used as a relay apparatus, a relay method, a relay program, and a communication system capable of performing bandwidth control of communication to be relayed considering a multimedia included in communication by a wireless terminal.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A relay apparatus of the present invention for relaying communication between a plurality of wireless terminals and a wired network, includes:
    a wireless communication part for enabling wireless communication between the plurality of wireless terminals and the relay apparatus;
    a wired network connecting part for connecting the relay apparatus and the wired network including a communication control apparatus that controls starting and ending of communication between the wireless terminals;
    a priority data recording part for recording communication identification data that represents a prioritized communication to be relayed by priority and required bandwidth data that represents a quantity of the transport bandwidth required by the prioritized communication;
    a priority control part for relaying the prioritized communication by priority compared with the others based on the communication identification data recorded in the priority data recording part;
    a request receiving part for receiving, from the wireless terminal, a request message that contains communication identification data representing a starting communication and multimedia type data representing one or more multimedia types of the streaming communication contained within the starting communication;
    a selecting part for selecting at least one multimedia type of the streaming communication contained within the starting communication, referring the required bandwidth data recorded in the priority data recording part and data representing bandwidth required for relaying each streaming communication calculated by the multimedia type data;
    an updating part for updating the data which is recorded in the priority data recording part, newly adding data representing a quantity of bandwidth for relaying the streaming communication whose multimedia type is selected by the selecting part and the communication identification data representing a starting communication;
    a responding part for transmitting data that represents the streaming communication to be relayed by priority, selected by the selecting part, to the communication control apparatus, as a response to the request message,
    wherein the selecting part selects the multimedia type of the each streaming communication contained within the starting communication not to exceed a predetermined upper limit of the total value of bandwidth required for relaying the prioritized communication even if adding the required bandwidth for relaying the starting communication.

2. The relay apparatus according to claim 1, further comprising a precedence recording part that records a precedence of a plurality of multimedia types,
    wherein the selecting part selects at least one multimedia type of the streaming communication to be relayed by priority based on the precedence recorded in the precedence recording part.

3. The relay apparatus according to claim 1, wherein the selecting part requests the communication control apparatus to inquire of a wireless terminal that requests starting of communication about a multimedia type of a streaming communication to be relayed by priority, obtains data that represents the multimedia type of the streaming communication to be relayed by priority as a response to the request from the communication control apparatus, and selects the multimedia type of the streaming communication based on the obtained data.

4. A relay apparatus for relaying communication between a plurality of wireless terminals and a wired network, comprising:
    a wireless communication part for enabling wireless communication between the plurality of wireless terminals and the relay apparatus;
    a wired network connecting part for connecting the relay apparatus and the wired network including a communication control apparatus that controls start and ending of communication of the wireless terminals;
    a plurality of priority grade data recording parts for recording stream identification data for identifying a streaming communication to be relayed by priority with respect to each stage of priority provided in a plurality of stages;

a precedence recording part for recording precedence of a plurality of multimedia types;

a priority control part for relaying a streaming communication specified by the stream identification data recorded in the priority grade data recording part with higher priority, by priority compared with a streaming communication specified by the stream identification data recorded in the priority grade data recording part with lower priority;

a request receiving part for receiving a request message containing the communication identification data that represents a starting communication of a wireless terminal ready to be started and multimedia type data that represents each multimedia type of one or a plurality of streaming communications included in the starting communication;

a priority determining part for determining priority with respect to a streaming communication of each multimedia type represented by the multimedia type data, based on the precedence recorded in the precedence recording part; and an updating part for recording the stream identification data for identifying the streaming communication specified by the communication identification data and the multimedia type data in the priority grade data recording part in accordance with the priority determined by the priority determining part, with respect to the streaming communication of each multimedia type.

5. A communication system accessible wirelessly from a plurality of wireless terminals, comprising: a relay apparatus for relaying communication between a wired network and the plurality of wireless terminals, and a communication control apparatus connected to the relay apparatus via the wired network, wherein the communication control apparatus includes:

an interconnecting part for transmitting a request message that contains communication identification data representing a starting communication and multimedia type data representing one or more multimedia types of the streaming communication contained within the starting communication, based on a request for starting of communication received from an arbitrary wireless terminal; and a communication control part for receiving a response to the request message transmitted by the interconnecting part from the relay apparatus, and controlling the starting of communication for each streaming communication included in the starting communication based on the response, wherein the relay apparatus includes:

a priority data recording part for recording communication identification data that represents a prioritized communication to be relayed by priority and the required bandwidth data that represents a quantity of the transport bandwidth required by the prioritized communication;

a priority control part for relaying the prioritized communication by priority compared with the others based on the communication identification data recorded in the priority data recording part;

a request receiving part for receiving, from the wireless terminal, a request message that contains communication identification data representing a starting communication and multimedia type data representing one or more multimedia types of the streaming communication contained within the starting communication;

a selecting part for selecting at least one multimedia type of the streaming communication contained within the starting communication, referring the required bandwidth data recorded in the priority data recording part and data representing bandwidth required for relaying each streaming communication calculated by the multimedia type data;

an updating part for updating the data which is recorded in the priority data recording part, newly adding data representing a quantity of bandwidth for relaying the streaming communication whose multimedia type is selected by the selecting part and the communication identification data representing a starting communication;

a responding part for transmitting data that represents the streaming communication to be relayed by priority, selected by the selecting part, to the communication control apparatus, as a response to the request message, wherein the selecting part selects the multimedia type of the each streaming communication contained within the starting communication not to exceed a predetermined upper limit of the total value of bandwidth required for relaying the prioritized communication even if adding the required bandwidth for relaying the starting communication.

6. A relay method for a relay apparatus to relay communication between a plurality of wireless terminals and a wired network, the relay apparatus including: a wireless communication part for enabling wireless communication between the plurality of wireless terminals and the relay apparatus; a wired network connecting part for connecting the relay apparatus and the wired network including a communication control apparatus that controls starting and ending of communication between the wireless terminals; and a priority data recording part for recording communication identification data that represents a prioritized communication to be relayed by priority and required bandwidth data that represents a quantity of the transport bandwidth required by the prioritized communication, the method includes:

a request receiving operation of receiving, from the wireless terminal, a request message that contains communication identification data representing a starting communication and multimedia type data representing one or more multimedia types of the streaming communication contained within the starting communication;

a selecting operation of selecting at least one multimedia type of the streaming communication contained within the starting communication, by referring the required bandwidth data recorded in the priority data recording part and data representing bandwidth required for relaying each streaming communication calculated by the multimedia type data;

an updating operation of updating the data which is recorded in the priority data recording part, by newly adding data representing a quantity of bandwidth for relaying the streaming communication whose multimedia type is selected by the selecting operation and the communication identification data representing a starting communication; and a responding operation of transmitting data that represents the streaming communication to be relayed by priority, selected by the selecting operation, to the communication control apparatus, as a response to the request message, wherein the selecting operation, the multimedia type of the each streaming communication contained within the starting communication is selected not to exceed a predetermined upper limit of the total value of bandwidth required for relaying the prioritized communication even if adding the required bandwidth for relaying the starting communication.

7. A tangible recording medium comprising a relay program for causing a computer to execute processing of relaying communication between a plurality of wireless terminals and a wired network, the computer including: a wireless communication part for enabling wireless communication between the plurality of wireless terminals and the computer; a wired network connecting part for connecting the computer and the wired network including a communication control apparatus that controls starting and ending of communication between the wireless terminals; and a priority data recording part for recording communication identification data that represents a prioritized communication to be relayed by priority and required bandwidth data that represents a quantity of the transport bandwidth required by the prioritized communication, the program causes the computer to execute:

request receiving processing of receiving, from the wireless terminal, a request message that contains communication identification data representing a starting communication and multimedia type data representing one or more multimedia types of the streaming communication contained within the starting communication;

selecting processing of selecting at least one multimedia type of the streaming communication contained within the starting communication, by referring the required bandwidth data recorded in the priority data recording part and data representing bandwidth required for relaying each streaming communication calculated by the multimedia type data;

updating processing of updating the data which is recorded in the priority data recording part, by newly adding data representing a quantity of bandwidth for relaying the streaming communication whose multimedia type is selected by the selecting processing and the communication identification data representing a starting communication; and responding processing of transmitting data that represents the streaming communication to be relayed by priority, selected by the selecting processing, to the communication control apparatus, as a response to the request message, wherein the selecting processing, the multimedia type of the each streaming communication contained within the starting communication is selected not to exceed a predetermined upper limit of the total value of bandwidth required for relaying the prioritized communication even if adding the required bandwidth for relaying the starting communication.

8. A relay method for a relay apparatus to relay communication between a plurality of wireless terminals and a wired network, the relay apparatus including: a wireless communication part for enabling wireless communication between the plurality of wireless terminals and the relay apparatus; a wired network connecting part for connecting the relay apparatus and the wired network including a communication control apparatus that controls starting and ending of communication of the wireless terminals; a plurality of priority grade data recording parts for recording stream identification data for identifying a streaming communication to be relayed by priority with respect to each stage of priority provided in a plurality of stages; and a precedence recording part for recording precedence of a plurality of multimedia types, the method comprising:

a priority control operation of relaying a streaming communication specified by the stream identification data recorded in the priority grade data recording part with higher priority, by priority compared with a streaming communication specified by the stream identification data recorded in the priority grade data recording part with lower priority;

a request receiving operation of receiving a request message containing the communication identification data that represents a starting communication of a wireless terminal ready to be started and multimedia type data that represents each multimedia type of one or a plurality of streaming communications included in the starting communication;

a priority determining operation of determining priority with respect to a streaming communication of each multimedia type represented by the multimedia type data, based on the precedence recorded in the precedence recording part; and an updating operation of recording the stream identification data for identifying the streaming communication specified by the communication identification data and the multimedia type data in the priority grade data recording part in accordance with the priority determined by the priority determining operation, with respect to the streaming communication of each multimedia type.

9. A tangible recording medium comprising a relay program for causing a computer to execute processing of relaying communication between a plurality of wireless terminals and a wired network, the computer including: a wireless communication part for enabling wireless communication between the plurality of wireless terminals and the computer; a wired network connecting part for connecting the computer and the wired network including a communication control apparatus that controls starting and ending of communication of the wireless terminals; a plurality of priority grade data recording parts for recording stream identification data for identifying a streaming communication to be relayed by priority with respect to each stage of priority provided in a plurality of stages; and a precedence recording part for recording precedence of a plurality of multimedia types, the program causes the computer to execute:

priority control processing of relaying a stream specified by the stream identification data recorded in the priority grade data recording part with higher priority, by priority compared with a stream specified by the stream identification data recorded in the priority grade data recording part with lower priority;

request receiving processing of receiving a request message containing the communication identification data that represents a starting communication of a wireless terminal ready to be started and multimedia type data that represents each multimedia type of one or a plurality of streaming communications included in the starting communication;

priority determining processing of determining priority with respect to a streaming communication of each multimedia type represented by the multimedia type data, based on the precedence recorded in the precedence recording part; and updating processing of recording the stream identification data for identifying the streaming communication specified by the communication identification data and the multimedia type data in the priority grade data recording part in accordance with the priority determined in the priority determining processing, with respect to the streaming communication of each multimedia type.

10. A relay method according to claim 8, wherein the precedence recording part records multimedia priority data representing the precedence of a plurality of multimedia types included in a combination of the media types, the multimedia priority data being provided for each combination pattern of the multimedia types, and the priority determining operation (processing) determines priority with respect to a streaming communication of each multimedia type represented by the multimedia type data, based on the precedence of multimedia pattern corresponding to the multimedia types represented by the multimedia type data.

11. A tangible recording media according to claim 9, wherein the precedence recording part records multimedia priority data representing the precedence of a plurality of multimedia types included in a combination of the media types, the multimedia priority data being provided for each combination pattern of the multimedia types, and the priority determining operation (processing) determines priority with respect to a streaming communication of each multimedia type represented by the multimedia type data, based on the precedence of multimedia pattern corresponding to the multimedia types represented by the multimedia type data.

* * * * *